(12) United States Patent
Kono et al.

(10) Patent No.: US 6,373,001 B1
(45) Date of Patent: Apr. 16, 2002

(54) WEIGHING, PACKAGING AND INSPECTING SYSTEM

(75) Inventors: Katsuaki Kono; Yukio Nakagawa, both of Shiga; Yasushi Yamaguchi, Kyoto, all of (JP)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 09/474,036

(22) Filed: Dec. 28, 1999

(30) Foreign Application Priority Data

| Dec. 28, 1998 | (JP) | 10-373245 |
| Dec. 28, 1998 | (JP) | 10-373260 |
| Jan. 11, 1999 | (JP) | 11-003644 |
| Apr. 7, 1999 | (JP) | 11-099907 |

(51) Int. Cl.$^7$ ............... G01G 19/387; G01G 23/01
(52) U.S. Cl. ............ 177/25.18; 73/1.13; 177/25.19
(58) Field of Search ............ 177/25.18, 25.19, 177/50; 73/1.13

(56) References Cited

U.S. PATENT DOCUMENTS

| 4,499,961 A | * | 2/1985 | Fukuda | 177/25.18 |
| 4,529,050 A | * | 7/1985 | Mosher et al. | 177/25.18 |
| 4,609,058 A | * | 9/1986 | Sashiki et al. | 177/25.18 |
| 4,669,557 A | * | 6/1987 | Nakagawa | 177/25.18 |
| 4,853,881 A | * | 8/1989 | Yamada | 177/25.18 |
| 5,760,342 A | * | 6/1998 | Takeda et al. | 177/25.18 |
| 5,881,532 A | * | 3/1999 | Kitagawa | 53/54 |
| 5,998,740 A | * | 12/1999 | Kvisgaard et al. | 177/25.18 |
| 6,105,419 A | * | 8/2000 | Michels et al. | 73/49.3 |

FOREIGN PATENT DOCUMENTS

| EP | 0-104084 | 3/1984 |
| EP | 0-743509 | 11/1996 |
| JP | 4-128105 | 4/1992 |
| JP | 9-301327 | 11/1997 |

* cited by examiner

*Primary Examiner*—Randy W. Gibson
(74) *Attorney, Agent, or Firm*—Hogan & Hartson, L.L.P.

(57) ABSTRACT

There is provided an abnormal device determining means (CPU 51) which reads a tendency of displacement between the combination calculated weight Wc of the contents M and the post-discharge Ws measured value of the same contents M measured after such contents M have been bagged and which, based on the tendency of displacement so read, determines which one of the combination calculated value Wc and the post-discharge measured value Ws is abnormal, and a display device (54) for displaying a result of the determination. Thus, since based on the displacement tendency of the combination calculated value Wc and the post-discharge measured value Ws, which one of the combination calculated value Wc and the post-discharge measured value Ws is abnormal is determined, it can readily and easily grasped which one of the combination weighing apparatus (1) and the weight checker (300) suffers from a trouble.

40 Claims, 28 Drawing Sheets

Fig.4A

First Measurement History Storage 13a

| | | 1 | 2 | 3 | 4 | 5 | 6 | Combination Calculated Value | Post-discharge Measured Value |
|---|---|---|---|---|---|---|---|---|---|
| Rejected | 1st Time | × | × | × | | | | 101.1 | 98.1 |
| Acceptable | 2nd Time | | | ○ | ○ | | ○ | 102.3 | 102.3 |
| Rejected | 3rd Time | | × | × | | × | | 100.2 | 97.1 |
| Rejected | 4th Time | × | × | | × | | | 100.3 | 95.7 |
| Acceptable | 5th Time | | | ○ | | ○ | ○ | 100.3 | 100.2 |
| Acceptable | 6th Time | ○ | | | ○ | | ○ | 100.3 | 100.3 |

○ Hopper in Normal Combination
× Hopper in Abnormal Combination

Fig.4B

Defects History Storage 13b

| | 1 | 2 | 3 | 4 | 5 | 6 | |
|---|---|---|---|---|---|---|---|
| 1st Time | × | × | × | | | | → No.1,2,3 |
| 3rd Time | | × | × | | × | | → No.2,3 |
| 4th Time | × | × | | × | | | |
| | : | : | : | : | : | : | |

Is any abnormality occurring in one of the weighing hoppers No. 1, No.2 and No.3?

Fig. 5B

Is any abnormality occurring in one of the weighing hoppers No. 2 and No. 3?

Fig. 5C

Is any abnormality occurring in the hopper No. 2?

Fig. 5D

Is there any abnormality in the weight checker?

Fig.7A

First Measurement History Storage 13a

| | | 1 | 2 | 3 | 4 | 5 | 6 | Combination Calculated Value | Post-discharge Measured Value |
|---|---|---|---|---|---|---|---|---|---|
| Rejected | 1st Time | × | × | × | | | | 101.1 | 98.1 |
| Acceptable | 2nd Time | | | ○ | ○ | | ○ | 102.3 | 102.3 |
| Rejected | 3rd Time | | × | × | | × | | 100.2 | 97.1 |
| Rejected | 4th Time | × | × | | × | | | 100.3 | 95.7 |
| Acceptable | 5th Time | | | ○ | | ○ | ○ | 100.3 | 100.2 |
| Acceptable | 6th Time | ○ | | | ○ | | ○ | 100.3 | 100.3 |

○ Hopper in Normal Combination
× Hopper in Abnormal Combination

Fig.7B

Conforming Goods History Storage 13d

| | 1 | 2 | 3 | 4 | 5 | 6 |
|---|---|---|---|---|---|---|
| 2nd Time | | | ○ | ○ | | ○ |
| 5th Time | | | ○ | | ○ | ○ |
| 6th Time | ○ | | | ○ | | ○ |
| ⋮ | ⋮ | ⋮ | ⋮ | ⋮ | ⋮ | ⋮ |

1st Time

| | |
|---|---|
| Normal : | |
| Unclear : | 4. 5. 6 |
| Possibly Not Normal : | 1. 2. 3. |

Fig.8B

2nd Time

| | |
|---|---|
| Normal : | 3. 4. 6. |
| Unclear : | 5 |
| Possibly Not Normal : | 1. 2 |

Fig.8C

3rd Time

| | |
|---|---|
| Normal : | 3. 4. 6 |
| Unclear : | |
| Possibly Not Normal : | 1. 2. 5 |

Fig.8D

4th Time

| | |
|---|---|
| Normal : | 3. 4. 6 |
| Unclear : | |
| Possibly Not Normal : | 1. 2. 5 |

Fig.8E

5th Time

| | |
|---|---|
| Normal : | 3. 4. 5. 6 |
| Unclear : | |
| Possibly Not Normal : | 1. 2 |

Fig.8F

6th Time

| | |
|---|---|
| Normal : | 1. 3. 4. 5. 6 |
| Unclear : | |
| Possibly Not Normal : | 2 |

Fig. 10

Weight History Storage 3 3 b

|  | Combination Calculated Value | Post-discharge Measured Value |
|---|---|---|
| n Times Preceding | 100.7 | 102.7 |
| n-1 Times Preceding | 100.1 | 101.5 |
| : | : | : |
| 2 Times Precding | 100.2 | 101.3 |
| Previous | 100.3 | 100.4 |

Average Values Storage 3 3 c

|  | Combination Average Value Wa | Post discharge Average Value Wb |
|---|---|---|
| Average Value | 100.36 | 101.56 |

Fig.14A

First Measurement History Storage 13a

| identification number of the hopper | 1 | 2 | 3 | 4 | 5 | 6 | Combination Calculated Value |
|---|---|---|---|---|---|---|---|
| 1st Time | △ | △ | △ | | | | 101.1 |
| 2nd Time | | | △ | △ | | △ | 102.3 |
| 3rd Time | | △ | △ | | △ | | 100.2 |
| 4th Time | △ | △ | | △ | | | 100.3 |
| 5th Time | | | △ | | △ | △ | 100.3 |
| 6th Time | △ | | | △ | | △ | 100.3 |

△ Hopper in Combination

Fig.14B

Third Measurement History Storage 53a

| | identification number of the hopper | 1 | 2 | 3 | 4 | 5 | 6 | Combination Calculated Value | Post-discharge Measured Value |
|---|---|---|---|---|---|---|---|---|---|
| Rejected | 1st Time | × | × | × | | | | 101.1 | 98.1 |
| Acceptable | 2nd Time | | | ○ | ○ | | ○ | 102.3 | 102.3 |
| Rejected | 3rd Time | | × | × | | × | | 100.2 | 97.1 |
| Rejected | 4th Time | × | × | | × | | | 100.3 | 95.7 |
| Acceptable | 5th Time | | | ○ | | ○ | ○ | 100.3 | 100.2 |
| Acceptable | 6th Time | ○ | | | ○ | | ○ | 100.3 | 100.3 |

○ Hopper in Normal Combination
× Hopper in Abnormal Combination

Fig.14C

Defects History Storage 53b

| | 1 | 2 | 3 | 4 | 5 | 6 |
|---|---|---|---|---|---|---|
| 1st Time | × | × | × | | | |
| 3rd Time | | × | × | | × | |
| 4th Time | × | × | | × | | |
| : | : | : | : | : | : | : |

Weight History Storage 55b

| | Combination Calculated Value | Post-discharge Measured Value |
|---|---|---|
| n Times Preceding | 100.7 | 101.7 |
| n−1 Times Preceding | 100.1 | 101.1 |
| ⋮ | ⋮ | ⋮ |
| 2 Times Preceding | 100.2 | 101.3 |
| Previous | 100.3 | 101.5 |

Deviation History 55f

| | $Wc - Ws$ |
|---|---|
| $Wd_n$ | −1.0 |
| $Wd_{n-1}$ | −1.0 |
| ⋮ | ⋮ |
| $Wd_2$ | −1.1 |
| $Wd_1$ | −1.2 |

Fig.17B

Weight History Storage 55b

| | Combination Calculated Value | Post-diacharge Measured Value |
|---|---|---|
| n Times Preceding | 102.7 | 102.7 |
| n−1 Times Preceding | 100.1 | 101.5 |
| ⋮ | ⋮ | ⋮ |
| 2 Times Preceding | 100.2 | 101.3 |
| Previous | 101.3 | 100.4 |

Deviation History 55f

| | $Wc - Ws$ |
|---|---|
| $Wd_n$ | 0 |
| $Wd_{n-1}$ | −1.4 |
| ⋮ | ⋮ |
| $Wd_2$ | −1.1 |
| $Wd_1$ | +0.9 |

Fig.18
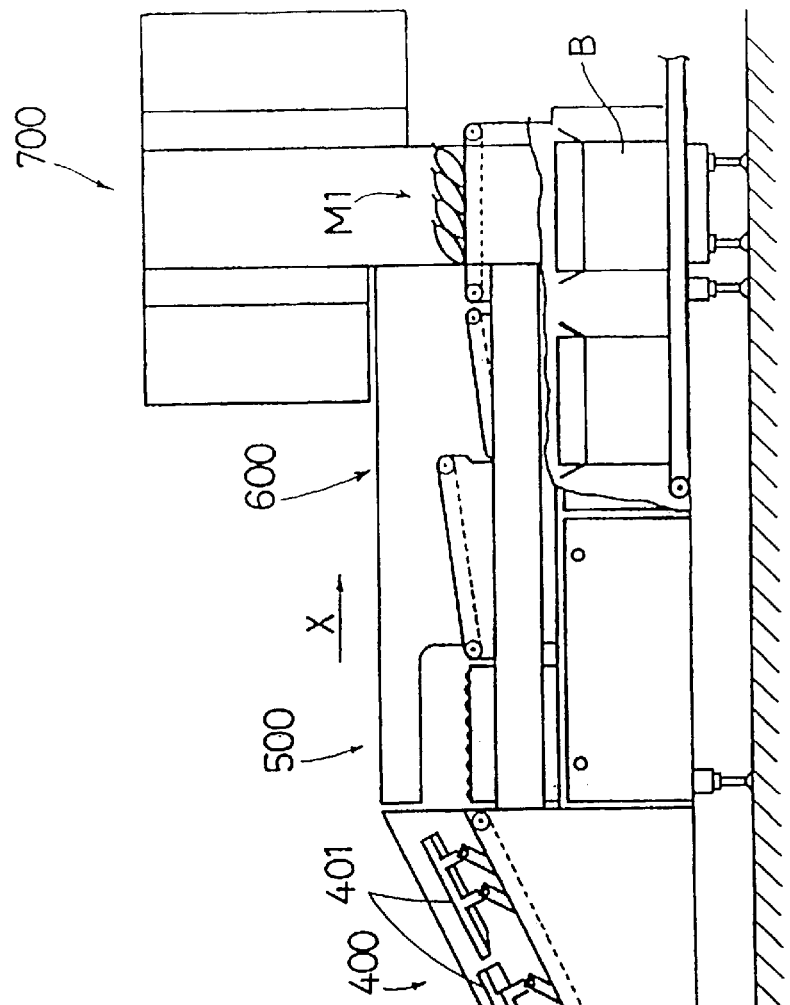
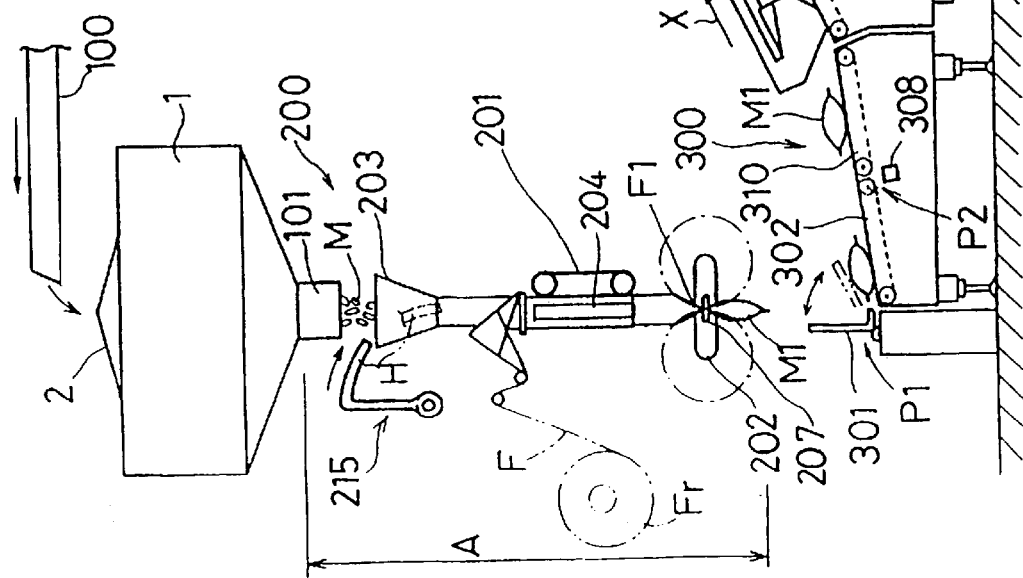

Fig. 26A

First Diagnosis History Storage 53g

| No. | Bite | Seal Checker | Result of Diagnosis |
|---|---|---|---|
| n | Not occurred | Acceptable | |
| : | : | : | |
| 3 | Occurred | Rejected | Defective End Seal |
| 2 | Occurred | Rejected | Defective End Seal |
| 1 | Occurred | Rejected | Defective End Seal |

Fig. 26B

Second Diagnosis History Storage 53h

| | Weight Checker | Seal Checker | Result of Diagnosis |
|---|---|---|---|
| n Times Preceding | Acceptable | Rejected | →Defective Vertical Seal |
| : | : | : | |
| : | Acceptable | Acceptable | |
| : | Acceptable | | |
| : | : | : | |
| : | Rejected | Rejected | →Defective End Seal |
| : | Rejected | Rejected | →Defective End Seal |
| : | : | : | |
| 3 Times Preceding | Acceptable | Acceptable | |
| 2 Times Preceding | Rejected | Rejected | →Defective End Seal |
| Previous | Rejected | Rejected | →Defective End Seal |

Fig. 28A

Combination Weighing Setting Screen

| Call No. | | Item Name | | |
|---|---|---|---|---|
| 001 | | Potatoes | | |
| Call No. Selection | | Number of Bags | Number of Discharge Time | |
| | | 60 | 1 | |
| Slave | | | | |
| Delay Time | | Target Weight | Strength | Time |
| 100 | | 50 | 10 | 500 |
| Setting for Combination Weighing Apparatus | Setting for Bagging and Packaging Machine | Setting for Weight Checker | Setting for Boxing Machine | Return |

Fig. 28B

Bagging & Packaging Machine Setting Screen

| Call No | | Item Name | | |
|---|---|---|---|---|
| 001 | | Potatoes | | |
| Call No Selection | | Number of Bags | Number of Discharge Time | |
| | | 60 | 1 | |
| Master | | | | |
| Delay Time | | Bag Length | Bag Width | Temperature | Time |
| 100 | | 25 | 20 | 169 | 100 |
| Setting for Combination Weighing Apparatus | Setting for Bagging and Packaging Machine | Setting for Weight Checker | Setting for Boxing Machine | Return |

WEIGHING, PACKAGING AND INSPECTING SYSTEM

BACKGROUND OF THE INVENTION

1. Field of the Invention

The present invention relates to a combination weighing system, a weight checking system, a weighing system utilizing the both and a weighing, packaging and inspecting system utilizing the weighing system.

2. Description of the Prior Art

Such a combination weighing apparatus as shown in FIG. 2 has hitherto been well known in the art. Referring to FIG. 2, articles M falling by gravity onto a central portion of a dispensing feeder 2 are supplied into a plurality of weighing hoppers $6i$ through a corresponding number of supply troughs $3i$ by way of associated pool hoppers $4i$. The weighing hoppers $6i$ are each provided with a weight detector $7i$ for detecting the weight of the articles M supplied into the corresponding weighing hopper $6i$. When a combination of weights of the articles M detected respectively by the weight detectors $7i$ attains a target weight or an approximate target weight close to the target weight, the articles M contained in some of the weighing hoppers $6i$ that have been selected in the combination are discharged from those selected weighing hoppers $6i$ collectively onto a collecting and discharging chute 9 and are then discharged downwards towards a next processing station.

Each of the weighing hoppers $6i$ is generally detachably mounted on a machine support structure so that some or all of the weighing hoppers $6i$ can be detached from the machine support structure for repair or cleansing purpose. For this reason, it may often occur that one or more of the weighing hoppers $6i$ once detached for any reason will not be properly set in position in the apparatus or one of the weighing hoppers $6i$ may be deformed and hence contact the next adjacent weighing hopper $6i$. Once this unusual or abnormal event occurs, the weight of the articles M can no longer be measured accurately, resulting a weighing failure. On the other hand, since the weighing hoppers $6i$ employed are in a plural number, much labor and time are required to find out one or more of the weighing hoppers $6i$ that have resulted in the weighing failure, resulting in inefficient and expensive maintenance operation.

Such a weight checker as shown in FIG. 12 has been also known in the art for weighing and inspecting articles while being transported. The weight checker shown therein by 300 executes a zero-point adjustment when a conveyor 310 transports no, article M1, that is, the conveyor 310 is empty of the articles M1.

However, in a system wherein a high-speed packaging machine is installed upstream of the weight checker 300 with respect to the direction of transport of the articles M1, the weight checker 300 will be operated at a high operating rate. In the event that the weight checker 300 is being operated at such a high operating rate, the spacing between the articles M1 being successively transported would decrease as shown by the broken and solid lines in FIG. 12 with the weight checker 300 consequently unable to assume an empty condition and, hence, failing to accomplish the zero-point adjustment. For this reason, the weighing accuracy of the weight checker 300 will decrease.

On the other hand, in a weighing, packaging and inspecting system, articles weighed to a predetermined amount is bagged by a vertical pillow-type bagging machine and a product comprising the bagged articles is subsequently checked as to the weight by the weight checker and checked by a seal checker to see if the bag has been successfully sealed, thereby accomplishing a high-speed weighing, packaging and inspection of the product. By way of example, after candies such as potato chips have been weighed to a predetermined amount by the combination weighing apparatus shown in FIG. 2, they are bagged into a single bag by the vertical pillow-type bagging machine, which bag is then checked by the weight checker of FIG. 12 to determine if the bag contains the predetermined weight of the candies. In such system, since a plurality of machines are lined to perform in unison a series of processing to eventually produce the bagged product, it is difficult to grasp where deficiency has occurred in the production line once a defective product (NG product) is found. In addition, once the defective product is found, a similar defect would occur in successively processed products. Accordingly, in order to secure a predetermined operativity or an expected production yield, remedy should be carried out as soon as possible to remove the cause of deficiency.

In view of the foregoing, the Japanese Laid-open Patent Publication No. 9-301327 discloses a centralized system by which pieces of information originating from the various processing machines in the production line can be visually presented by a display device in a centralized supervisory and control equipment through a communication network so that an operator watching the display device can determine the presence or absence of an abnormality occurring in one or some of the processing machines with reference to the displayed pieces of information, that is, information on processing results.

However, according to the above discussed publication, there is a problem in that unless the operator makes a decision based on the displayed pieces of information associated with the respective processing machines, none of the processing machines can be determined having a deficiency. Another problem also arise in that the nature of the deficiency in the processing machines ever found can not be easily determined and, for this reason, the decision making takes a substantial length of time, accompanied by reduction in productivity and production yield. Moreover, the system disclosed in the above discussed publication requires a skilled operator to perform the determination of the nature of the deficiency.

SUMMARY OF THE INVENTION

In view of the foregoing, the present invention has been devised to provide a weighing, packaging and inspecting system in a weighing system including a combination weighing system and a weight checking system for facilitating determination of the an abnormal condition which would occur in the weighing system.

To this end, a combination weighing system according to one aspect of the present invention is of a design wherein a combination of some of weighing hoppers accommodating therein articles that have been supplied thereto, which combination results in a combination calculated value of measured weights of the articles contained in some of the weighing hoppers forming the combination, falling within a predetermined combination tolerance, is selected and the articles in the selected weighing hoppers are subsequently discharged therefrom. This combination weighing apparatus is featured in that determination is made to find if the combination calculated value of the respective measured weights of the containers contained in the selected weighing hoppers is displaced from the total weight (hereinafter referred to as "post-discharge measured value) of the combined articles discharged from the selected weighing hoppers and merged together, which total weight is measured after those articles have been discharged from the selected weighing hoppers (that is, to find occurrence of an inaccurate weighing) so that information on identification numbers of the weighing hoppers utilized in the combination calculation can be outputted.

Since the combination weighing system according to one aspect of the present invention is so designed that the occurrence of the inaccurate weighing is determined depending on whether the combination calculated value is displaced from the total weight of the discharged and merged articles and the ID information on the identification numbers of the respective weighing hoppers selected in the combination is subsequently outputted, the operator can identify one or some of the weighing hoppers, which is or are out of order, on the basis of such information. Accordingly, there is no need to inspect all of the plural weighing hoppers, thereby facilitating the maintenance of the combination weighing apparatus.

The term "ID information" on the identification numbers of the weighing hoppers selected in the combination calculation referred to above and hereinafter is intended to means at least one of respective pieces of information which is related to either the identification numbers of the weighing hoppers which are operating properly or the identification numbers of the weighing hoppers which are operating improperly and, also, at least the information on either some of the weighing hoppers selected in the combination calculation or some of the weighing hoppers not selected in the combination calculation.

A combination weighting system according to a second aspect of the present invention is so designed that determination is made as to whether the combination calculated weight of the articles contained in the selected weighing hoppers and the post-discharge measured value of the combined article are displaced from each other and the weighing hopper which is out of order can be identified in reference to a result of determination of a number of measurements and the ID information on the identification numbers of the weighing hoppers that have been selected in the combination calculation.

With the combination weighing system according to the second aspect of the present invention, identification of the out-of-order weighing hopper can be visually presented by the display device or the combination weighing apparatus can be operated with the out-of-order weighing hopper isolated from the combination calculation. Accordingly, the maintenance can be increased.

It is to be noted that identification of the out-of-order weighing hopper is not always intended to means identification of the weighing hopper which is out of order and should be understood as intended to screen out the identification of numbers of two or more of the weighing hoppers which are out of order.

To accomplish the foregoing objective, the present invention is also directed to the weight checking system of determining whether the product is acceptable or is to be rejected, by weighing the product while the latter is being transported by means of a conveyor. This weight checking system is featured by comprising a comparing means for comparing weight information on the measured weight of the product weighed by the weight checking system with weight information on the measured weight of the same product measured by a different weighing device, and a zero-point defect determining means for determining the possibility of occurrence of a zero-point defect in the weight checking system in the event that a result of comparison performed by the comparing means departs from a tolerance.

With the weight checking system according to the present invention, the determination of the occurrence of the zero-point defect can be carried out without considerably reducing the operativity of the weight checking system.

In the practice of the present invention, in the event that the possibility has been determined of the occurrence of the zero-point defect, transport of the product towards the weight checking system may, for example, be delayed so that the zero-point adjustment of the weight checker can be carried out while no product is yet been delivered.

Accordingly, without the operativity being lowered substantially, a high weighing accuracy of the weight checking system can be maintained.

Also, if comparison can be made between an error before the zero-point adjustment and the difference between the measured weights after the zero-point adjustment, it is possible to determine which one of the zero-point abnormality in the weight checking system and an abnormality occurring in the different weighing device and a display appropriate to the event can be outputted.

The term "weight information" referred to hereinabove and hereinafter is intended to encompass not only information on the measured weight of only one product, but also information of the respective measured weight of a plurality of products (for example, an average value of the respective measured weights of the plural products).

The term "different weighing device" referred to hereinabove and hereinafter is intended to means a weighing device for weighing a product or an article corresponding to the merchandise to be weighed by the weight checking system and is represented by the combination weighing apparatus.

Also, the term "result of comparison" referred to hereinabove and hereinafter is intended to encompass not only the difference or ratio between information on measured weights having been compared, but also a change of such difference or ratio. By way of example, if the difference or ratio is greater than a predetermined tolerance, it can be determined that a weighing device is retrograded.

The weighing system according to the present invention designed to accomplish the foregoing object is featured by comprising an abnormal device determining means which reads a tendency of displacement between the combination calculated weight of the contents and the post-discharge measured value of the same contents measured after such contents have been bagged and which, based on the tendency of displacement so read, determines which one of the combination calculated value and the post-discharge measured value is abnormal, and a display device for displaying a result of the determination.

With the weighing system according to the present invention, based on the tendency of displacement between the combination calculated weight and the post-discharge measured value, determination is made to find which one of the combination calculated weight and the post-discharge measured value is abnormal and so is subsequently displayed. Accordingly, it can be easy to grasp which one of the combination weighing system and the weight checking system is defective. Accordingly, the operativity of the system as a whole and the production yield can be increased.

In particular, if the determination is carried out depending on whether an displacement abnormality in which the result of comparison between the combination calculated weight and the post-discharge measured value departs from the tolerance range occurs continuously or discontinuously, one of the devices which becomes defective can quickly and accurately grasped.

The term "displacement between the combination calculated weight and the post-discharge measured value" referred to hereinabove and hereinafter is intended to encompass not only a result of comparison such as the difference or ratio between the combination calculated weight and the post-discharge measured value with respect to the identical contents, but also whether or not such result of comparison falls within the tolerance range.

Also, the term "tendency of displacement" referred to hereinbefore and hereinafter is intended to means inclination of information combined with information on the displacement obtained with respect to the plural products, including, for example, change of the information on such displacement (a concept of the displacement with time element taken into consideration).

The principle of the present invention will now be described.

The combination weighing apparatus calculates the combination calculated weight by combining individual weights measured respectively by a plurality of weighing heads (weight detectors). Since the weighing heads selected in the combination are different for a combination discharge, failure of one of the weighing heads to operate properly results in random occurrence of proper and improper combination calculated weights. By way of example, in the event that the weighing head identified No. 2 as shown in FIG. 4A fails to operate properly, the proper and improper combination calculated weights occur depending on whether or not the weighing head identified No. 2 is selected in the combination calculation.

On the other hand, the weight checker measures the weight of the product being transported by the conveyor after such product has been completely transferred onto the conveyor. While the weight checker performs the well-known zero-point adjustment while no product exist on the conveyor, no zero-point adjustment can be performed if the number of items to be handled for unitary time is too many and, for this reason, the zero-point itself displace, resulting in a defective weight (displacement abnormality). In such case, the post-discharge measured value given by the weight checker will be defective continuously.

In view of the foregoing, where a relatively large displacement occur in the result of comparison between the combination calculated weight and the post-discharge measured value occurs continuously, it can be deduced that an abnormality has occurred in the weight checker. On the other hand, where such displacement occurs discontinuously, it can be deduced that an abnormality has occurred in the combination weighing apparatus.

To accomplish the foregoing objective, the present invention provides a weighing, packaging and inspecting system comprises a weighing apparatus for performing the weighing step of weighing contents to a predetermined weight, a packaging machine for performing the packaging step of bagging the contents discharged after the weight measurement, and an inspecting device for performing the inspecting step of inspecting the bagged product, and the weighing apparatus, the packaging machine and the inspecting device are connected with each other through a communication network. The weighing, packaging and inspecting system of the present invention is uniquely provided with an abnormality diagnosing determining means for checking pieces of information on processing of the same contents or product at each step to thereby diagnose the nature of abnormality occurring in each step, and a display device for displaying a result of diagnosis performed by the abnormality diagnosing determining means.

In this weighing, packaging and inspecting system of the present invention, since the pieces of information on results of processing performed by the various devices are checked against each other to determine the contents of abnormality occurring at each step and the result of diagnosis is then displayed by the display device, the operator can quickly grasp the nature of abnormality. As a result, the productivity of the system and the production yield can be increased.

Also, if the display device and an input device are connected by means of a communication network provided separately from respective control devices for the various processing devices, a remote controller can be equipped at the desired processing device. Accordingly, the workability can be increased.

If in addition to the result of diagnosis arrangement is made to enable the remote controller to output a halt command or a restore command to the various processing device, not only can the productivity and the production yield be increased, but also the number of attendant workers can be reduced.

In the present invention, the term "processing information" is intended to means information on the identification number of hoppers selected for the combination calculated weight and also for such combination calculation, where the weighing apparatus is a combination weighing apparatus.

In the case of the packaging machine, the term "processing information" is intended to means information on not only the timing and the presence or absence of a discharge request signal outputted to the weighing apparatus, but also a result of detection by a bite detecting means with respect to sealing jaws for sealing upper and lower ends of a packaging bag.

Where the inspecting machine is a weight checker, the term "processing information" is intended to means information on not only a result of determination of the acceptability and the measured weight of such product, but also the presence or absence of a detection signal by a product detector in order to know of the timing of measurement of the weight and the timing of such detection.

Where the inspecting device is a seal checker, the term "processing information" is intended to encompass a result of determination of the acceptability of seals.

Preferably, the weighing, packaging and inspecting system of the present invention includes the display device provided in a remote controller separate from each of the various devices.

Also, the weighing, packaging and inspecting system of the present invention preferably has not only a capability of displaying the abnormality status in the event of occurrence of an abnormality in the system but also a capability of transmitting the halt command to the various devices or the restore command necessary for the various devices to restore to a normal state.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 4A is a diagram showing a first measurement history storage employed in the first embodiment of the present invention, FIG. 4B is a diagram showing contents stored in a defects history storage employed in the first embodiment of the present invention;

FIGS. 5A to 5D are front elevational views of a touch screen showing different messages displayed thereon, respectively;

FIG. 7A is a diagram showing a first measurement history storage employed in a modification;

FIG. 7B is a diagram showing contents stored in an acceptability history storage employed in the modification;

FIGS. 8A to 8F are front elevational views of a touch screen showing different messages displayed thereon, respectively;

FIG. 10 is a diagram showing contents stored in a weight history storage and an average value storage, respectively;

FIG. 14A is a diagram showing a first measurement history storage employed in the third embodiment of the present invention;

FIG. 14B is a diagram showing a third measurement history storage employed in the third embodiment of the present invention;

FIG. 14C is a diagram showing contents stored in a defects history storage employed in the third embodiment of the present invention;

FIGS. 17A and 17B are conceptual diagrams showing contents stored in a modified form of the storages, respectively;

FIG. 18 is a schematic side view of the weighing, packaging and inspecting system according to a fifth preferred embodiment of the present invention;

FIG. 26A is a diagram showing contents stored in a first diagnosis history storage employed in the fifth embodiment of the present invention;

FIG. 26B is a diagram showing contents stored in a second diagnosis history storage employed in the fifth embodiment of the present invention;

FIGS. 28A and 28B are front elevational views of the touch screen, showing different messages displayed thereon, respectively.

DETAILED DESCRIPTION OF THE EMBODIMENTS

Hereinafter various preferred embodiments of the present invention will be described with reference to the accompanying drawings.

FIGS. 1 to 6 illustrates a weighing, packaging and inspecting system according to a first preferred embodiment of the present invention.

In the first place, the outline of the weighing, packaging and inspecting system shown in FIGS. 1 to 6 will be briefly described.

Figure 1:
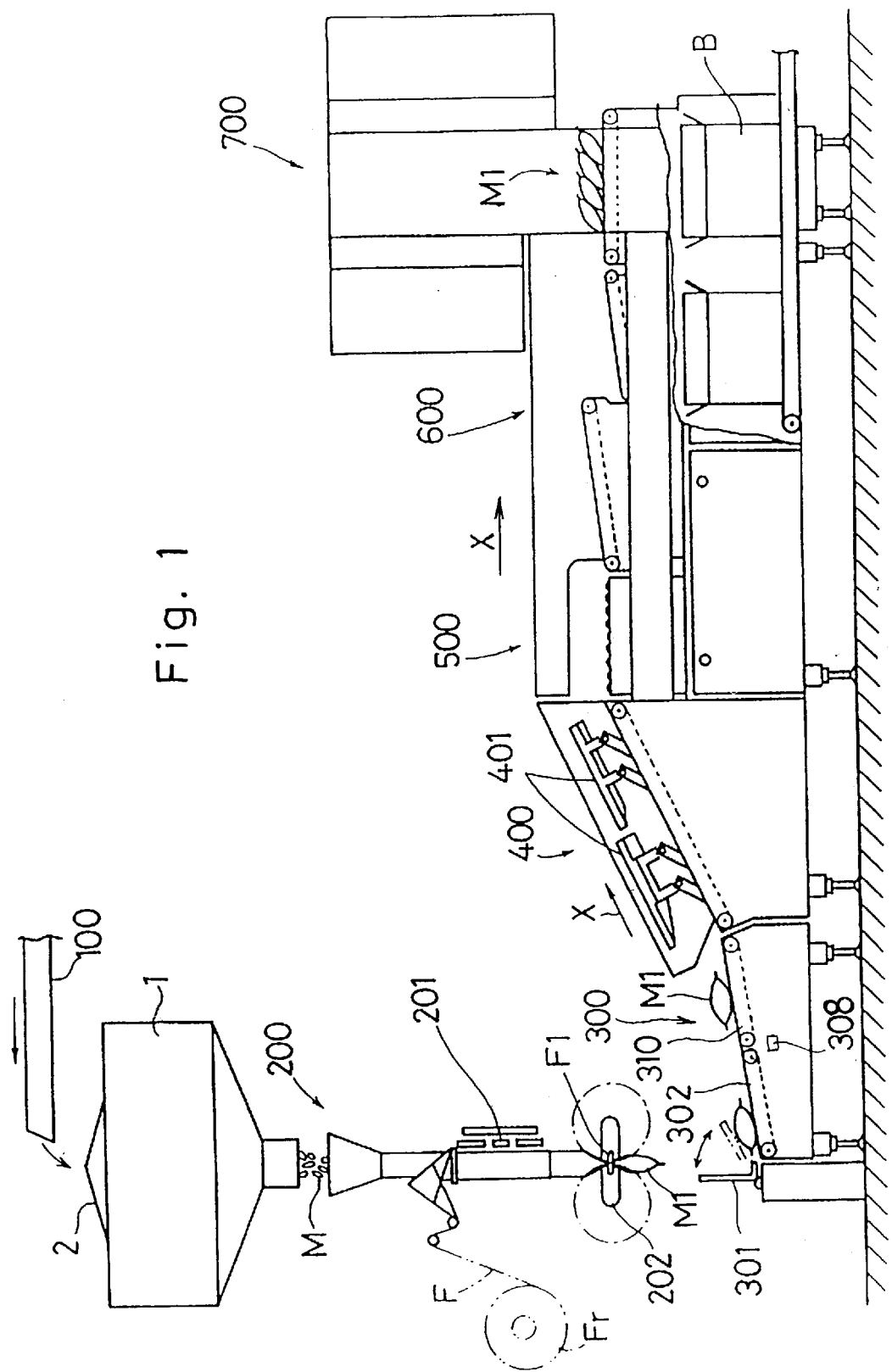
FIG. 1 is a schematic side view of a weighing, packaging and inspecting system according to a first preferred embodiment of the present invention.

Referring to FIG. 1, reference numeral 100 represents a delivery conveyor; reference numeral 1 represents a combination weighing apparatus; reference numeral 200 represents a bagging and packaging machine (a packaging machine); reference numeral 300 represents a weight checker; reference numeral 400 represents a seal checker; and reference numeral 700 represents a boxing machine. The delivery conveyor 100 is utilized to transport contents (articles) M to be weighed and then deliver them successively onto a center portion of a dispensing feeder 2 of the combination weighing apparatus 1. The contents M will, when collected in a plural number and are then bagged, become a product.

A combination weighing system of the present invention consists of the combination weighing apparatus 1 and a combination controller 10 that will be described later. A weight checking system of the present invention consists of the weight checker 300 and a checker control unit 30 that will be described later.

Figure 2:
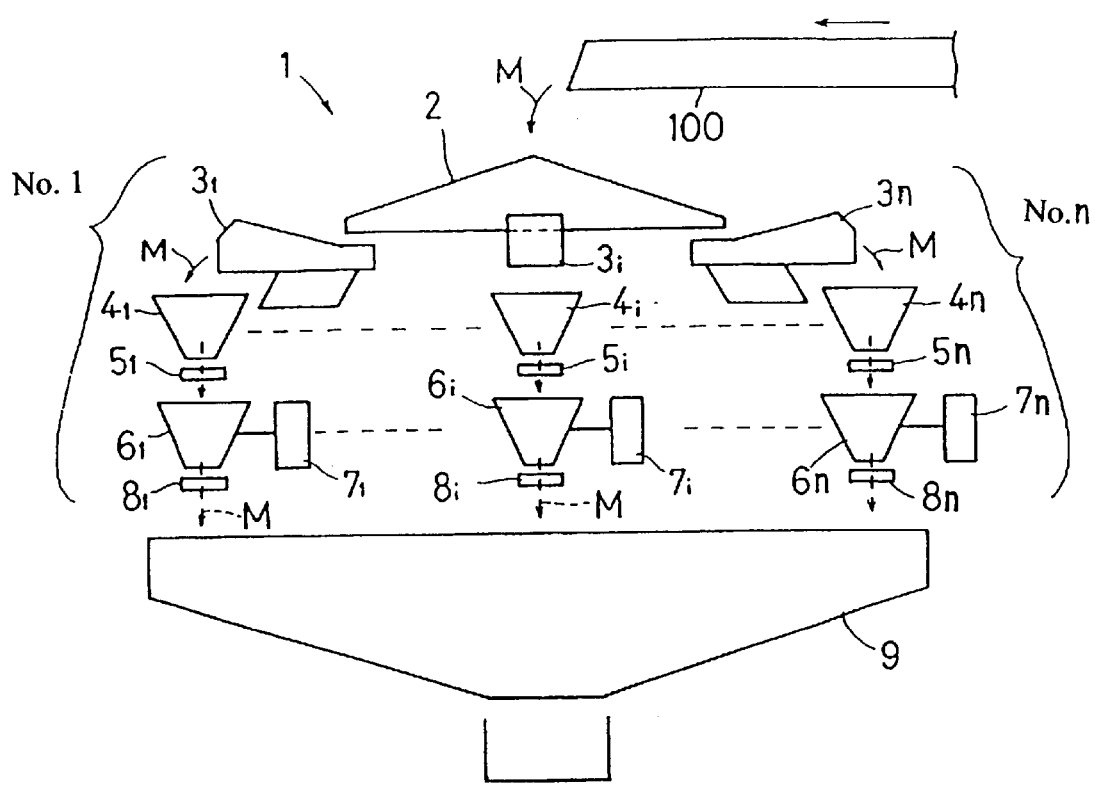
FIG. 2 is a conceptual diagram showing a function of a combination weighing apparatus.

As shown in FIG. 2, a plurality of supply troughs 3$i$ each comprised of an electromagnetically operated feeder are disposed at an outer peripheral edge of the dispensing feeder 2. The dispensing feeder 2 and the supply troughs 3$i$ are vibrated by a vibrating device so that the contents M on the dispensing feeder 2 can be supplied onto a corresponding pool hoppers 4$i$ disposed downstream of the supply troughs 3$i$ in alignment therewith. Each of those pool hoppers 4$i$ is provided with a gate 5$i$ so that the contents M supplied and received from the corresponding supply trough 3$i$ can be temporarily stored within the respective pool hopper 4$i$. Weighing hoppers 6$i$ are disposed downstream of the associated pool hopper 4$i$ in alignment therewith. Each of the weighing hoppers 6$i$ is provided with a weighing head including a weight detector 7$i$ for detecting the weight of the contents M supplied from the associated pool hopper 4$i$ onto the respective weighing hopper 6$i$ and a gate 8$i$. Positioned beneath the gates 8$i$ is a large collecting and discharging chute 9 and, as will be described later, by combining some of the weights of the contents M detected by the associated weight detectors 7$i$ so that the combination of the weights so combined, that is, the total weight of the contents M combined can attain a target weight or approximate target weight, the contents M are allowed to fall by gravity from the collecting and discharging chute 9 towards a bagging and packaging machine 200 shown in FIG. 1.

The bagging and packaging machine 200 shown in FIG. 1 is a so-called vertical pillow-type bagging machine and is so operable that a sheet-like web of film F drawn from a film roll Fr is fused by a vertical sealer 201 into a tubular form whereupon the contents M falling from above are filled in the tubular film Fr, and an upper end F1 of the film F immediately above the filled contents M is then fused (sealed) by means of an end sealer 202, followed by cutting of the film to provide a product M1 in a continuous fashion. This bagging and packaging machine may be of a type disclosed in, for example, the Japanese Laid-open Patent Publication No. 4-128105. The bagged product M1 falls downwardly and transported by a receiving conveyor 302 after having been laid down by a knock-down member 301. The products M1 successively produced are transported by the receiving conveyor 302 at intervals of predetermined pitch and are then successively transferred onto the weight checker 300.

Figure 3:
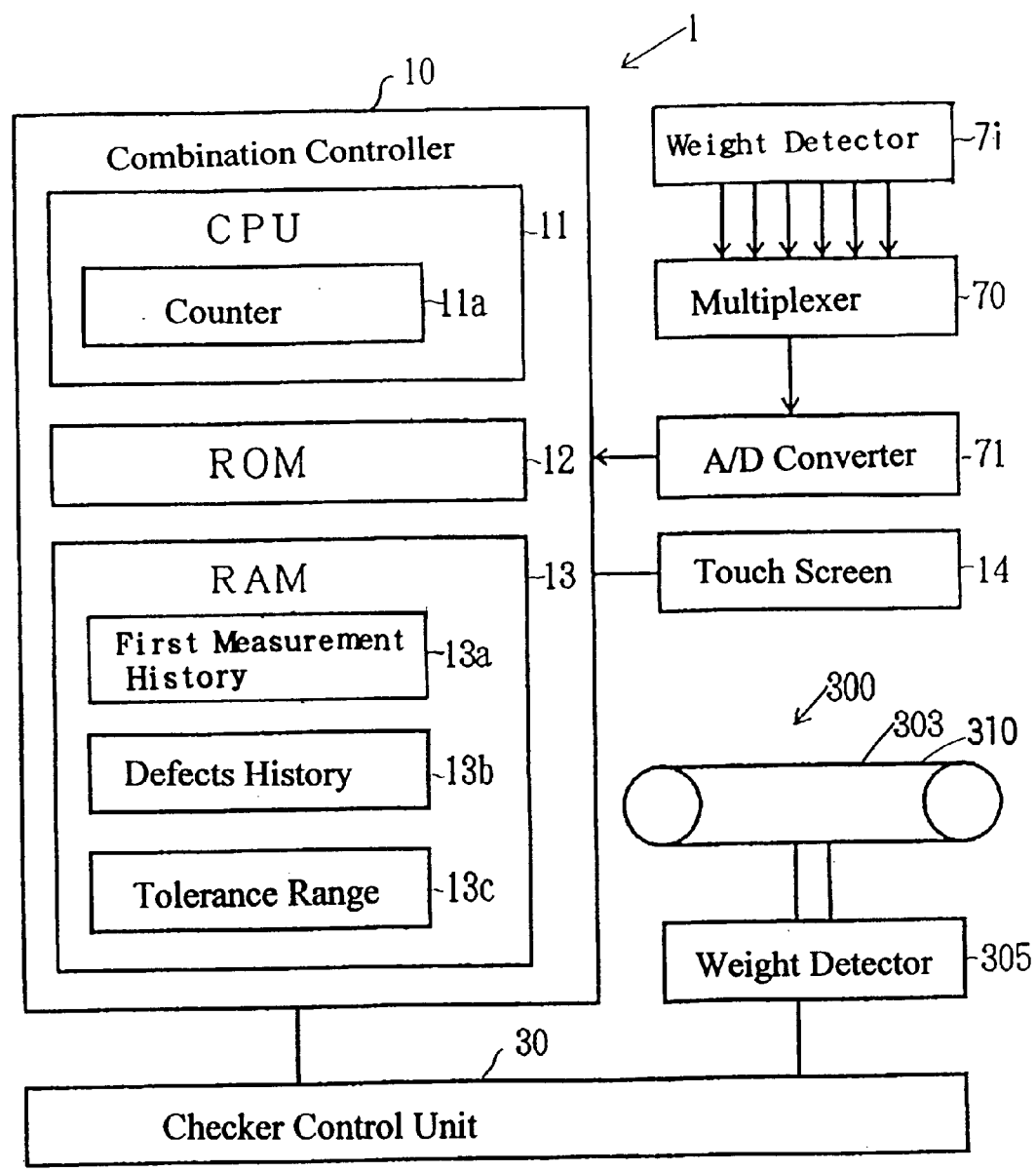
FIG. 3 is a schematic structural diagram showing an important portion of the first preferred embodiment of the present invention.

The weight checker 300 includes, as shown in FIG. 3, a weight detector 305 such as, for example, a load cell for measuring the weight of the product M1 and a conveyor 310 mounted on and supported by the weight detector 305. The conveyor 310 includes a drive belt 303. The weight checker 300 shown in FIG. 1 is so designed that while the product M1 is transported diagonally upwardly by the conveyor 310, the product M1 is weighed and inspected. The product M1 is subsequently transported from the weight checker 300 towards a seal checker 400.

The seal checker 400 transports the product M1, transferred from the weight checker 300, diagonally upwardly in a direction of transport X while the product M1 is suppressed from above by a retainer member 401 and, during this transport, inspects the presence or absence of a defective seal in the bag of the product M1 and the length of the product M1. A sorting device 500 is operable to eject the product M1 out of the system if the product M1 received from the seal checker 400 is deemed defective based on a result of inspection, but transports the M1 downstream in the direction of transport X if the product M1 is deemed acceptable based on the result of inspection. The product M1 is transported downstream towards the boxing machine 700 by a transport apparatus comprising the sorting device 500 and a line-up transport device 600. The boxing machine 700 is operable to load the product M1 into a cardboard box B.

The combination control executed by the combination weighing apparatus will now be described.

As shown in FIG. 3, each of the weight detectors 7$i$ outputs a detected weight to a multiplexer 70. The multiplexer 70 is operable in response to a predetermined synchronizing signal to output each of weight signals to an analog-to-digital (A/D) converter 71. The A/D converter 71 converts each of the weight signals into a weight value, represented by a digital signal, which is subsequently outputted to a combination controller (a microcomputer) 10.

The combination controller 10 calculates a combination calculated value Wc corresponding to a combination of one or more weight values, compares the combination calculated value Wc with a predetermined combination target value, selects a combination in which the combination calculated value Wc is within a combination tolerance range, for example, higher than the combination target value (lowermost limit value) and smaller than the uppermost limit value which is slightly higher than it, and opens the gates 8$i$, shown in FIG. 2, which correspond to the combination to allow the contents M to be discharged in combination from the weighing hoppers 6$i$ to the collecting and discharging chute 9.

An important structural feature of the system according to the illustrated embodiment of the present invention will be described hereinafter.

As shown in FIG. 3, the combination controller 10 and a checker control unit 30 both performing a control are connected with machine component parts such as, for example, an actuator or a motor through an interface not shown. The combination controller 10 and the checker control unit 30 are connected with each other through an interface not shown.

The checker control unit 30 is fed with a weight signal which is an output from the weight detector 305 converted into a weight. This checker control unit 30 when the weight signal is stabilized, calculates a post-discharge measured value Ws by subtracting a tare weight from the weight signal and, also, outputs a reject signal to the sorting device 500 shown in FIG. 1 in the even that the post-discharge measured value Ws is greater or smaller than a predetermined weight. In response to the reject signal, the sorting device 500 rejects the product M1 out of the system. On the other hand, the checker control unit 30 outputs the post-discharge measured value Ws to the combination controller 10.

The combination controller 10 includes a central processing unit (CPU) 11, a read-only memory (ROM 12 and a random access memory (AM) 13. The RAM 13 includes a first measurement history storage 13$a$, a defects history storage 13$b$ and a tolerance range storage 13$c$. As shown in FIG. 4A, the first measurement history storage 13$a$ stores therein the identification numbers of the weighing heads selected in the combination calculation, the combination calculated values Wc of the combination of the weighing heads and the post-discharge measured values Ws of the combination of the weighing heads, all of which are associated with each other.

The tolerance range storage 13$c$ stores therein, for example, a predetermined permissible displacement difference We between each combination calculated value Wc and the associated post-discharge measured value Ws of such combination. The CPU 11 performs a comparison of a weight deviation, obtained by subtracting the post-discharge measured value Ws of the same product M1 selected in the combination calculation, from the combination calculated value Wc with the permissible displacement difference We.

This CPU 11 causes the identification numbers of the weighing heads selected in the combination calculation to be stored in the defects history storage 13b, as shown in FIG. 4B, in the event that the absolute value of the weight deviation is greater than the permissible displacement difference We, indicative of the deviation abnormality (displacement abnormality), that is, a defect weighing.

The CPU 11 shown in FIG. 3 includes a counter 11a as will be described. The combination controller 10 is connected with a touch screen 14 through an interface not shown. The touch screen 14 includes, for example, a liquid crystal display and is capable of visually presenting various messages as shown in a display screen in FIG. 5A to 5D.

The principle of identifying the identification number of the defect machine and its operation will be described by way of example.

Assuming that weighing defects occur at the "first time", "third time" and "fourth time" as shown in FIG. 4B, it can be determined from a result of the "first time" that which one of the machines identified by 1, 2 and 3, respectively is likely to be not normal. Based on the result of this determination, a query message "Is any abnormality occurring in one of the weighing hoppers No. 1, No. 2 and No. 3?" as shown in FIG. 5A is displayed on the touch screen 14.

From the result of the "first time" and the "third time" at which the weighing defects have occurred as shown in FIG. 4B, it can be determined that one of the machines identified by 2 and 3 common to the two weighing results is abnormal. Based on the result of this determination, a query message "Is any abnormality occurring in one of the weighing hoppers No. 2 and No. 3?" shown in FIG. 5B is displayed on the touch screen 14. Also, from results of the "first time", "third time" and "fourth time" weighing, it can be determined that the machine identified by 2 common to these weighing results is abnormal. Based on the result of this determination, a query message "Is any abnormality occurring in the weighing hopper No. 2?" as shown in FIG. 5C is displayed on the touch screen 14.

In this way, based on the information on the identification number on some of the hoppers selected in the combination calculation during the improper weighing operation, the identification number of one or more of the hoppers supposed to be not normal can be identified and outputted.

Figure 6:
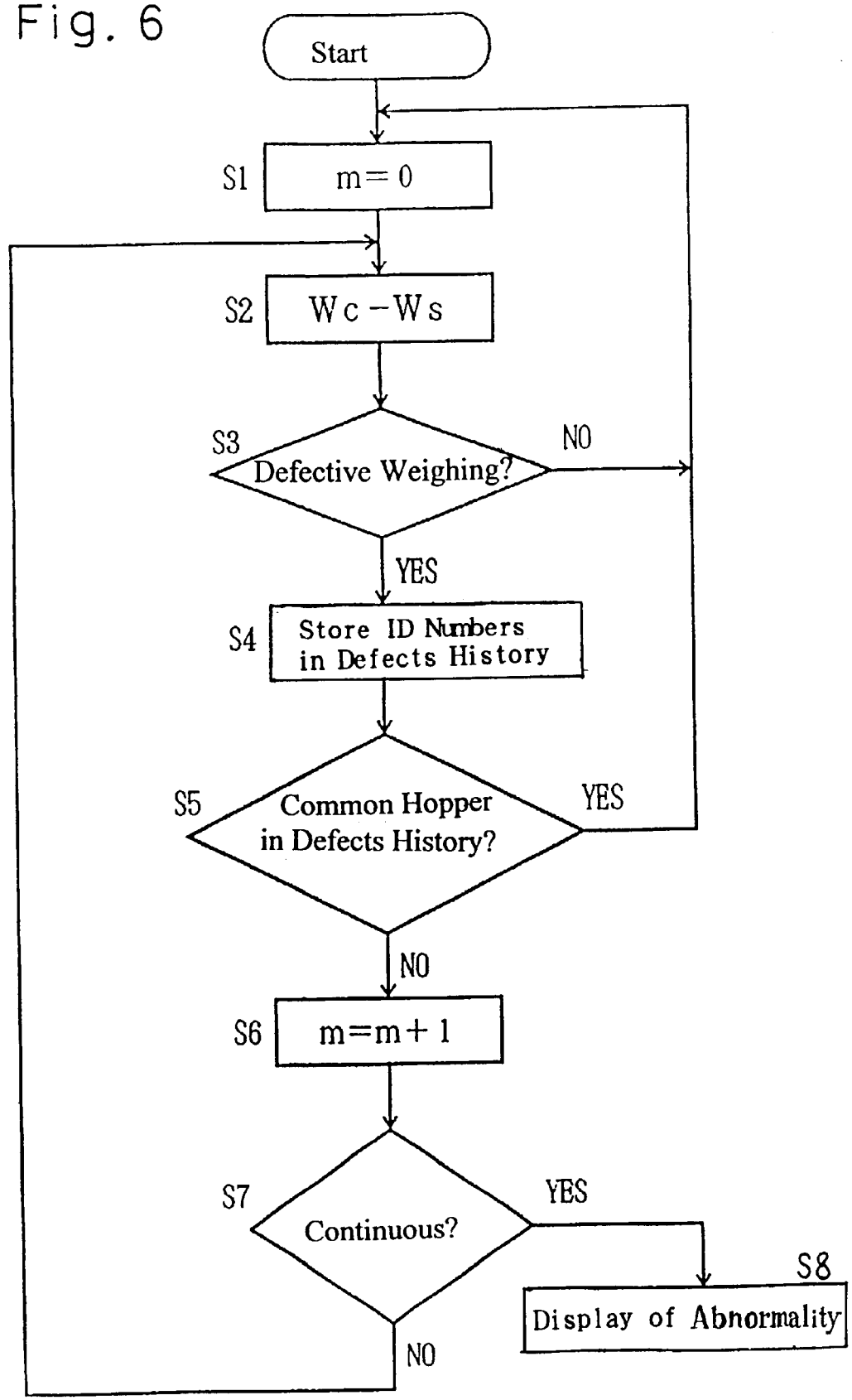
FIG. 6 is a flowchart showing a hopper identifying mode executed in the first embodiment of the present invention.

Hereinafter, the manner by which the hopper is identified will be described with reference to the flowchart shown in FIG. 6.

When a hopper identification mode starts, the counter 11a (FIG. 3) is cleared to zero at step S1, followed by step S2. At step S2, the CPU 11 associates the combination calculated value Wc, the identification number of the weighing heads selected the combination calculation and the post-discharge measured value Ws of the same product M1 which has been subjected to the combination calculation with each other and cause them to be stored in the first measurement history storage 13a. On the other hand, the CPU 11 calculates a weight deviation, followed by step S3.

At step S3, the CPU 11 compares the weight deviation with the permissible displacement difference We and proceeds to step S4 if it is determined a defective weighing (deviation abnormality). On the other hand, if it is determined not a defective weighing (deviation abnormality), the step S1 is resumed. At step S4, the CPU 11 causes the defects history storage 13b to store the identification numbers of some of the weighing heads which have been selected in the combination calculation and then proceeds to step S5.

At step S5, based on the identification number stored in the defects history storage 13b shown in FIG. 4B, determination of the identification number common to all of a plurality of improper weighing operations is carried out. Where the identification number is stored only at one time of the improper weighing operation or the identification number common to the plural improper weighing operations exists, such identification number is displayed on the touch screen 14 and thereafter the program flow returns to step S1. On the other hand, where no common identification number exist, the program flow proceeds to step S6.

In this way, depending on whether or not the weight deviation between the combination calculated value Wc and the post-discharge measured value Ws deviates, for example, whether or not it is within the permissible displacement difference We, the deviation abnormality, that is, the defective weighing is determined and, in the event of the defective weighing, by determining the identification number of the common hopper having participated in the combination calculation, it is possible to screen out and identify the identification number of the hopper which is not normal based on the information on a plurality of weight measurements.

At step S6, the counter 11a is incremented, followed by step S7. At step S7, comparison is made of the count of the counter 11a with a predetermined value. In the event that the count of the counter 11a is greater than the predetermined value, it is determined that there is a high possibility of abnormality occurring in the weight checker 300 in view of the fact that, even though the defective weight measurement occurs, non-existence of the identification number of the common hopper is repeated a predetermined number of times, followed by step S8. On the other hand, if the count of the counter 11a is smaller than the predetermined value, the program flow returns to step S2. At step S8, as shown in FIG. 5D, a message "Is there any abnormality occurring in the weight checker?" is displayed on the touch screen 14.

Although in the illustrated embodiment of the present invention, arrangement has been made to specify the identification number of the hopper which is not normal and then display it on the touch screen 14, it may be possible that the combination weighing apparatus 1 is continuously operated with the machine of the specified identification number so specified excluded from the combination calculation.

Also, although based on the contents stored in the defects history storage 13b, the hopper which is not normal has been identified and displayed on the touch screen 14, the defects history storage 13b may be dispensed with and, instead, arrangement may be made that the contents stored in the first measurement history storage 13a shown in FIG. 4A are displayed on the touch screen 14 so that the operator can identify the hopper which is not normal. In addition, the contents stored in the defects history storage 13b may be displayed on the touch screen 14 so that the operator can identify the hopper which is not normal.

Although in the event of the defective weighing the identification numbers of some of the weighing heads that have been selected in the combination calculation have been stored in the defects history storage 13b, a conforming goods history storage 13d may be utilized in place of the defects history storage 13b as shown in FIG. 7B. In such case, the conforming goods history storage 13d stores the identification numbers of some of the weighing heads selected in the combination calculation that has not resulted in the defective weighing. In the event of the occurrence of the defective weighing, the CPU 11 causes the conforming goods history storage 13d to store the identification numbers of the weighing heads selected in the combination calculation that has not resulted in the defective weighing during subsequent cycles of weighing. Arrangement may be made that the CPU 11 can identify and output the identification number of the hopper that is not normal, by calculating the common identification numbers of the hoppers not selected in the combination of conforming goods based on the identification numbers stored in the conforming goods history storage 13d.

Also, the contents stored in the conforming goods history storage 13d may be displayed on the touch screen 14 so that the operator can identify the hopper that is not normal.

Furthermore, without the defects history storage 13b, as shown in FIG. 8, arrangement may be made that based on the contents stored in the first measurement history storage 13a the stored contents are classified into and then displayed three items, "Normal", "Uncertain" and "Possibly Not Normal". By way of example, since the "first time" shown in FIG. 4A has resulted in the defective weighing, not only are the identification numbers of some of the machines selected in such weighing displayed in the entry under "Possibly Not Normal", but the identification numbers of the machine not selected in such weighing are displayed in the entry under "Uncertain" as shown in FIG. 8A. Since the "second time" shown in FIG. 4A has resulted in the proper weighing, not only are the identification numbers of some of the machines selected in such weighing displayed in the entry under "Normal", but such identification numbers of the machines selected in such weighing are erased from the entries "Uncertain" and "Possibly Not Normal" as shown in FIG. 8B. By repeating similar displays, the hopper that is not normal can be identified and outputted as shown in FIG. 8F.

A second preferred embodiment of the present invention is shown in FIGS. 9 to 12, reference to which will now be made. It is to be noted that component parts shown therein and similar to those in the first preferred embodiment of the present invention are designated by like reference numerals and the details thereof are not reiterated for the sake of brevity.

An important structural feature of the system according to the second embodiment of the present invention will be described hereinafter.

Figure 9:
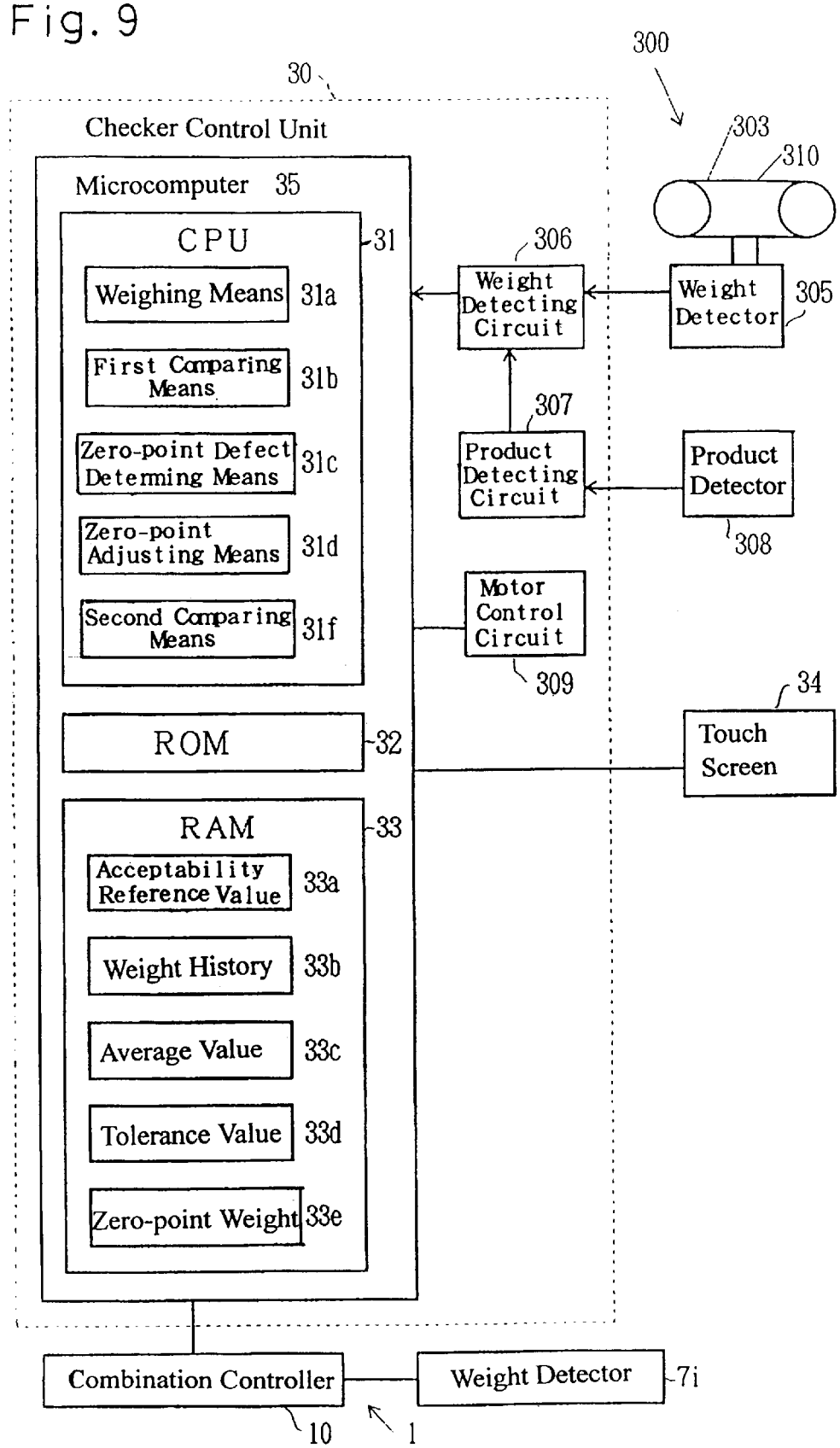
FIG. 9 is a schematic structural diagram showing an important portion of a second preferred embodiment of the present invention.

As shown in FIG. 9, the combination controller 10 for the combination weighing system and the checker control unit 30 for the weight checking system, respectively, are connected with machine component parts such as an actuator and a motor through an interface not shown. The combination controller 10 and the checker control unit 30 are connected with each other through an interface not shown.

The checker control unit 30 includes a microcomputer 35, a weight detecting circuit 306, a product detecting circuit 307 and a motor control circuit 309. The weight detecting circuit 306 and the motor control circuit 309 are connected with the microcomputer 35 through an interface not shown. The weight detecting circuit 306 is connected with a weight detector 305 for receiving a weight signal from such weight detector 305.

The product detecting circuit 307 is connected with a good detector 308. This good detector 308 may comprise a photo-detector and is disposed between a conveyor 310 and a receiving conveyor 302. When the product detector 308 detects the product M1, the product detecting circuit 307 shown in FIG. 9 outputs a goods detection signal to the weight detecting circuit 306. Based on the goods detection signal, the weight detecting circuit 306 outputs to the microcomputer 35 at a predetermined timing, a weight signal which corresponds to a measured signal from which a vibratory component is subtracted.

On the other hand, when the measurement signal from the weight detector 305 decreases below a predetermined reference voltage, that is, the conveyor 310 is empty, the weight detecting circuit 306 outputs a zero-point signal comprising the measurement signal to the microcomputer 35. By subtracting the zero-point signal and the tare weight from the weight signal, the post-discharge measured value Ws which is a net weight of the product M1 can be obtained.

The motor control circuit 309 performs a control of a drive motor (not shown) for the conveyor 310.

The microcomputer 35 includes a central processing unit (CPU) 31, a read-only memory (ROM) 32 and a random access memory (RAM) 33. The RAM 33 includes an acceptance reference value storage 33a, a weight history storage 33b, an average value storage 33c, a tolerance value storage 33d and a zero-point weight storage 33e. The acceptance reference value storage 33a stores an acceptance reference value providing a reference for the acceptability of the product M1 (In general, the acceptability reference value is stored in terms of acceptance reference tolerance). The CPU 31 compares the post-discharge measured value Ws with the acceptance reference value and determines the acceptability of the product M1 if the post-discharge measured value Ws falls within the acceptance reference value. On the other hand, the CPU 31, in the event that the product M1 is determined unacceptable, outputs a sorting signal to the sorting device 500 so that the product M1 deemed defective can be rejected out of the system.

As shown in FIG. 10, the weight history storage 33b stores combination calculated values Wc of the products M1 (the bagged product M1 containing the same contents M as discharged in combination) having been deemed acceptable, which were measured until one cycle before to n-cycles before. The combination calculated value Wc and the post-discharge measured value Ws are updated each time the calculation is performed.

The CPU 31 calculates a combination average value Wa, which is an average value of the combination calculated values Wc obtained during the n-cycles stored in the weight history storage 33b shown in FIG. 10, and a post-discharge measured average value Wb, which is an average value of the post-discharge measured values Ws obtained during the n-cycles stored in the weight history storage 33b shown in FIG. 10. The average value storage 33c stores therein the combination average value Wa and the post-discharge measured average value Wb. The tolerance value storage 33d shown in FIG. 9 stores therein a tolerance value Wp as will be described later. The zero-point weight storage 33e stores therein the current and previous zero-point weights that have been updated.

The CPU 31 includes a weighing means 31a, a first comparing means 31b, a zero-point defect determining means 31c, a zero-point adjusting means 31d and a second comparing means 31f.

The weighing means 31a of the CPU 31 calculates the post-discharge measured value Ws by subtracting the zero-point signal from the weight signal outputted from the weight detecting circuit 306 and then subtracting the predetermined tare weight from such weight.

The first comparing means 31b calculates a measurement deviation (Wa−Wb) by determining the combination average value Wa and the post-discharge measured average value Wb and subtracting the post-discharge average value Wb from the combination average value Wa.

The zero-point defect determining means 31c compares the measurement deviation (Wa−Wb) with the tolerance value Wp and then determines based on the result of comparison if there is a possibility of occurrence of a zero-point defect. The zero-point adjusting means 31d performs a well-known zero-point adjustment such as disclosed in, for example, the Japanese Utility Model Publication No. 3-32985, the disclosure of which is herein incorporated by reference.

The second comparing means 31f compares the result after the zero-point adjustment with the measurement deviation (Wa−Wb) and then determines if it is a zero-point defect.

The checker control unit 30 is connected with a touch screen 34, which is similar to that employed in the first preferred embodiment of the present invention, through an interface not shown and performs visual presentation of various displays based on an output from the CPU 31.

The combination controller 10 upon receipt of a break signal, as will be described later, from the checker control unit 30, causes the combination weighing apparatus 1 to break a combination discharge of the contents M for one cycle.

The principle of the present invention and its operation will now be described.

As shown in FIG. 10, of the products M1 each having a weight which has been deemed proper as a result of inspection done by the weight checker 300, the combination average value Wa is calculated with respect to the combination calculated values Wc for the n-cycles of the contents M which have been most recently weighed. The post-discharge measured average value Wb is then calculated with respect to the post-discharge measured values Ws of the contents M which are the same as the contents M subjected to such combination calculation. Thereafter, the discharge measured average value Wb is subtracted from the combination average value Wa to thereby calculate the measurement deviation (Wa−Wb).

It is eventually pointed out that since the two average values Wa and Wb should be equal to each other since they are an average value obtained by weighing the same contents M. Accordingly, comparison is made between the absolute value of the measurement deviation (Wa−Wb) and the predetermined tolerance value Wp and, if the absolute value of the measurement deviation (Wa−Wb) exceeds the predetermined tolerance value Wp, it can be determined that there is a possibility that a zero-point defect would have possibly occurred in the weight checker 300.

The zero-point defect determining mode (zero-point adjustment mode) will now be described with reference to the flowchart shown in FIG. 11.

At step S21, the first comparing means 31b calculates the measurement deviation (Wa−Wb) by subtracting the post-discharge measured average value Wb from the combination average value Wa and then calculates the absolute value of such deviation. The zero-point defect determining means 31c reads out the tolerance value Wp from the tolerance value storage 33d and compares the absolute value of the measurement deviation (Wa−Wb) with the tolerance value Wp. In the event that the absolute value of the measurement deviation (Wa−Wb) is greater than the tolerance value Wp, this zero-point defect determining means 31c determines that there is a possibility that the zero-point defect would have occurred in the weight checker 300, and then proceeds to step S22. On the other hand, where the absolute value of the measurement deviation (Wa−Wb) is smaller than the tolerance value Wp, the program flow returns to step S21.

At step S22, the checker control unit 30 performs the zero-point adjustment. In other words, when the CPU 31 outputs the break signal to the combination controller 10 or the bagging and packaging machine 200, the combination weighing apparatus 1 shown in FIG. I breaks the combination discharge of the contents M for one time. Simultaneously therewith, the bagging and packaging machine 200 ceases the packaging operation. Accordingly, delivery of the product M1 onto the weight checker 300 is delayed and, after a few seconds, an empty condition occurs in which the product M1 shown by the dotted line in FIG. 12 does not ride on the conveyor 310. At this time, the zero-point adjusting means 31d shown in FIG. 9 calculates, based on the zero-point signal of the empty conveyor 310 (FIG. 12), a new zero-point weight which is then updated and stored in the zero-point weight storage 33e to thereby accomplish the zero-point adjustment.

In this way, in the event that it is determined that the zero-point defect has occurred, the combination weighing apparatus 1 is caused to break the combination discharge of the contents M for one time and the zero-point adjustment is accomplished. For this reason, without substantially lowering the operativity of the system, a highly accurate weight measurement of the weight checker 300 can be secured with high precision.

Following the zero-point adjustment as step S22, the program flow proceeds to step S23. At step S23, the CPU 31 reads out the current and previous zero-point weights from the zero-point weight storage 33e and determines a variation value Wo by subtracting the previous zero-point weight from the currently calculated new zero-point weight, followed by step S24. At step S24, the CPU 31 determines if the absolute value of a value obtained by subtracting the variation value Wo from the measurement deviation (Wa−Wb) is within the tolerance value Wp.

In the event of the occurrence of the zero-point defect, the post-discharge measured average value Wb ought to have been varied by the variation value Wo and, therefore, the variation value Wo and the value of the measurement deviation (Wa−Wb) ought to be equal to each other. Accordingly, if a result obtained by subtracting the variation value Wo from the measurement deviation (Wa−Wb) is within the tolerance Wp, it can be determined that the zero-point defect has occurred. On the other hand, if the result of subtraction exceeds the tolerance value Wp, it can be determined that it is not a zero-point defect, but there is a possibility that an abnormality would have occurred in the combination weighing apparatus 1. Accordingly, if the result of subtraction is smaller than the tolerance value Wp, the CPU 31 determines the occurrence of the zero-point defect and the program flow proceeds to step S25. On the other hand, if the result of subtraction exceeds the tolerance value Wp, the CPU 31 determines the abnormality occurring in the combination weighing apparatus 1, and the program flow proceeds to step S26.

At step S25, the CPU 31 outputs to the touch screen 34 a message "Zero-point adjustment was performed in the weight checker." and, at the same time, the timing at which the zero-point adjustment is performed and the variation value Wo are stored in a predetermined storage in the RAM 33. At step S26, the CPU 31 causes the touch screen 34 to display a message "Is any abnormality in the combination weighing apparatus?"

Figure 11:
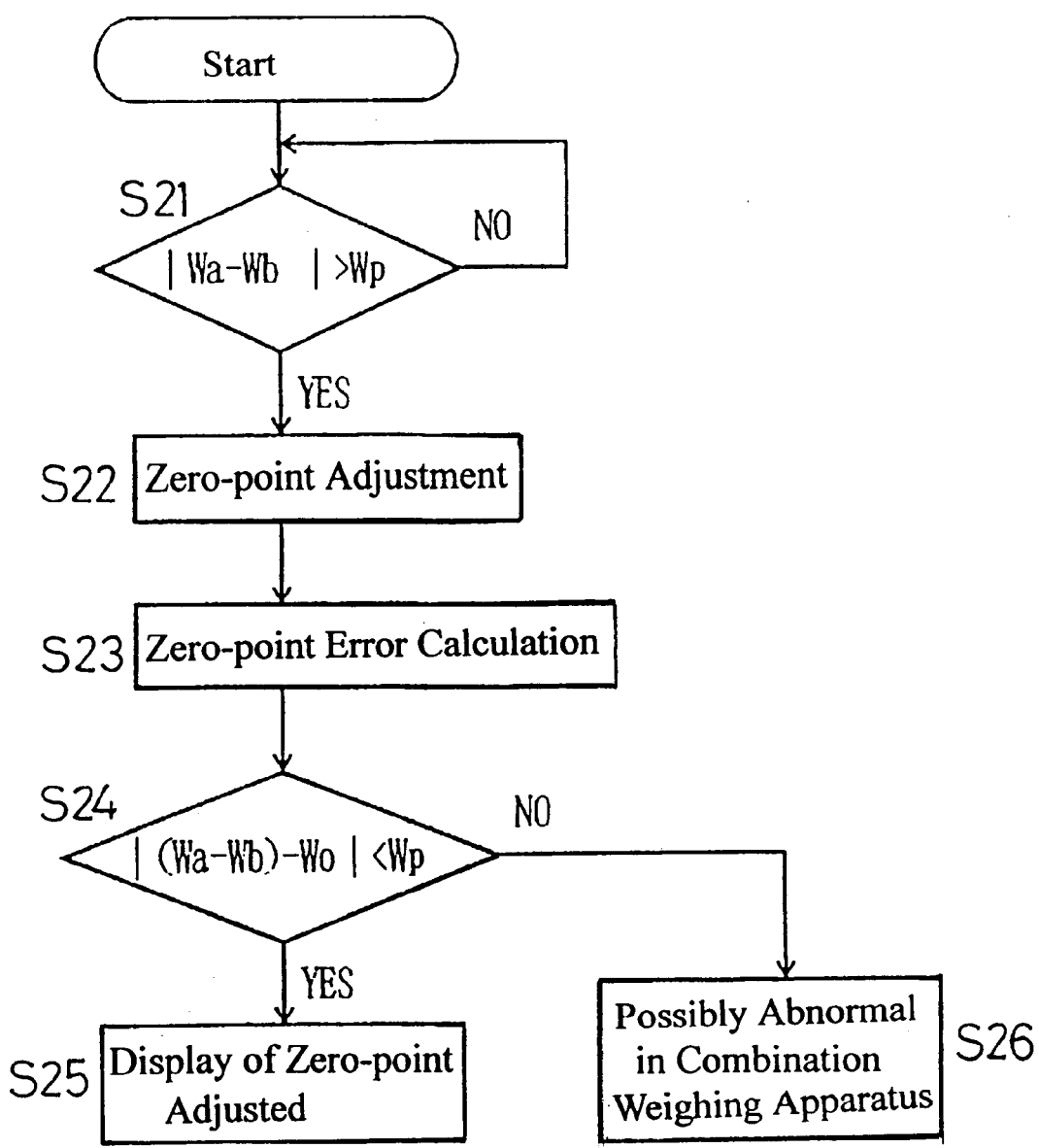
FIG. 11 is a flowchart showing a zero-point adjustment mode.
Figure 12:
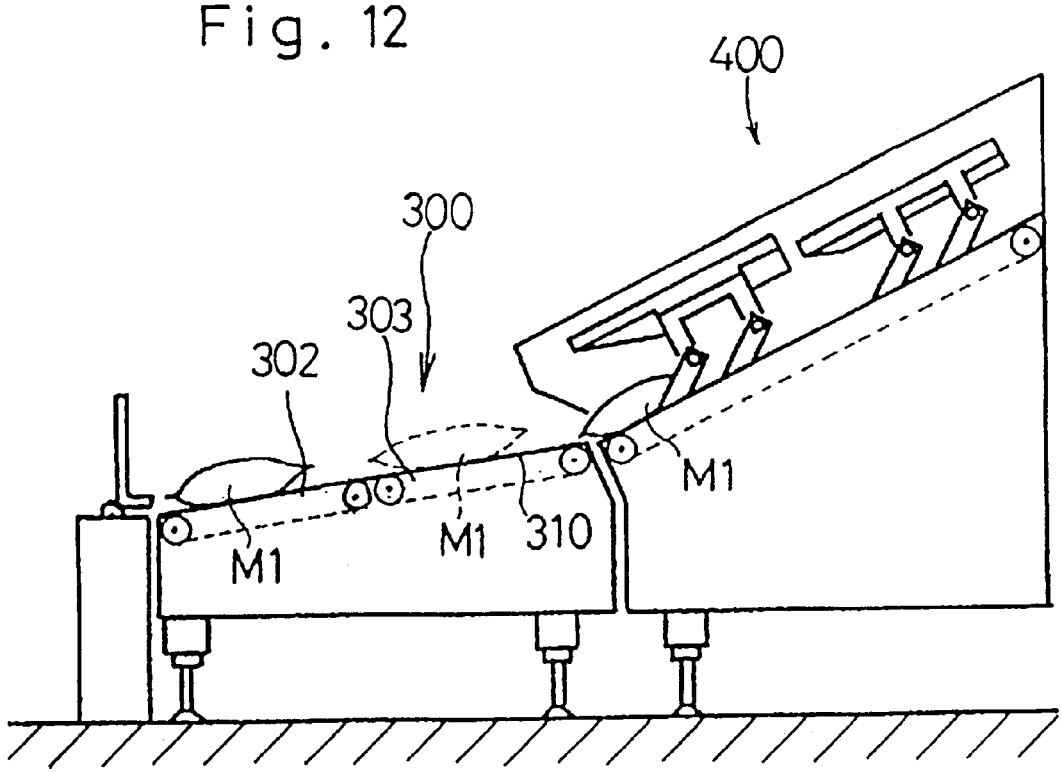
FIG. 12 is a schematic side view of a weight checker during the zero-point adjustment.

It is to be noted that the tolerance value Wp at step S21 shown in FIG. 11 and the tolerance value (predetermined value) Wp at step S24 may be a different value.

Figure 13:
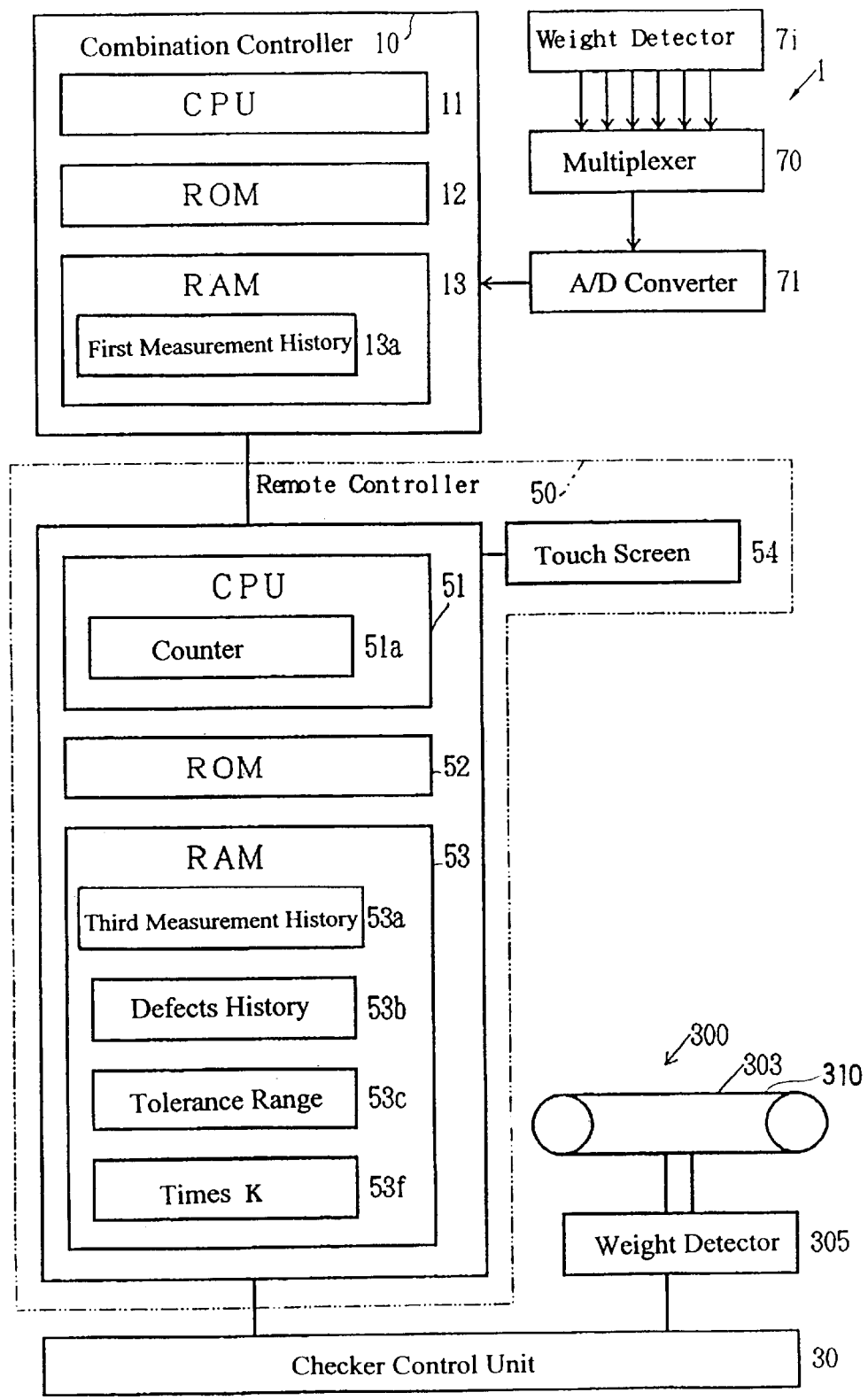
FIG. 13 is a schematic structural diagram showing an important portion of a third preferred embodiment of the present invention.
Figure 15:
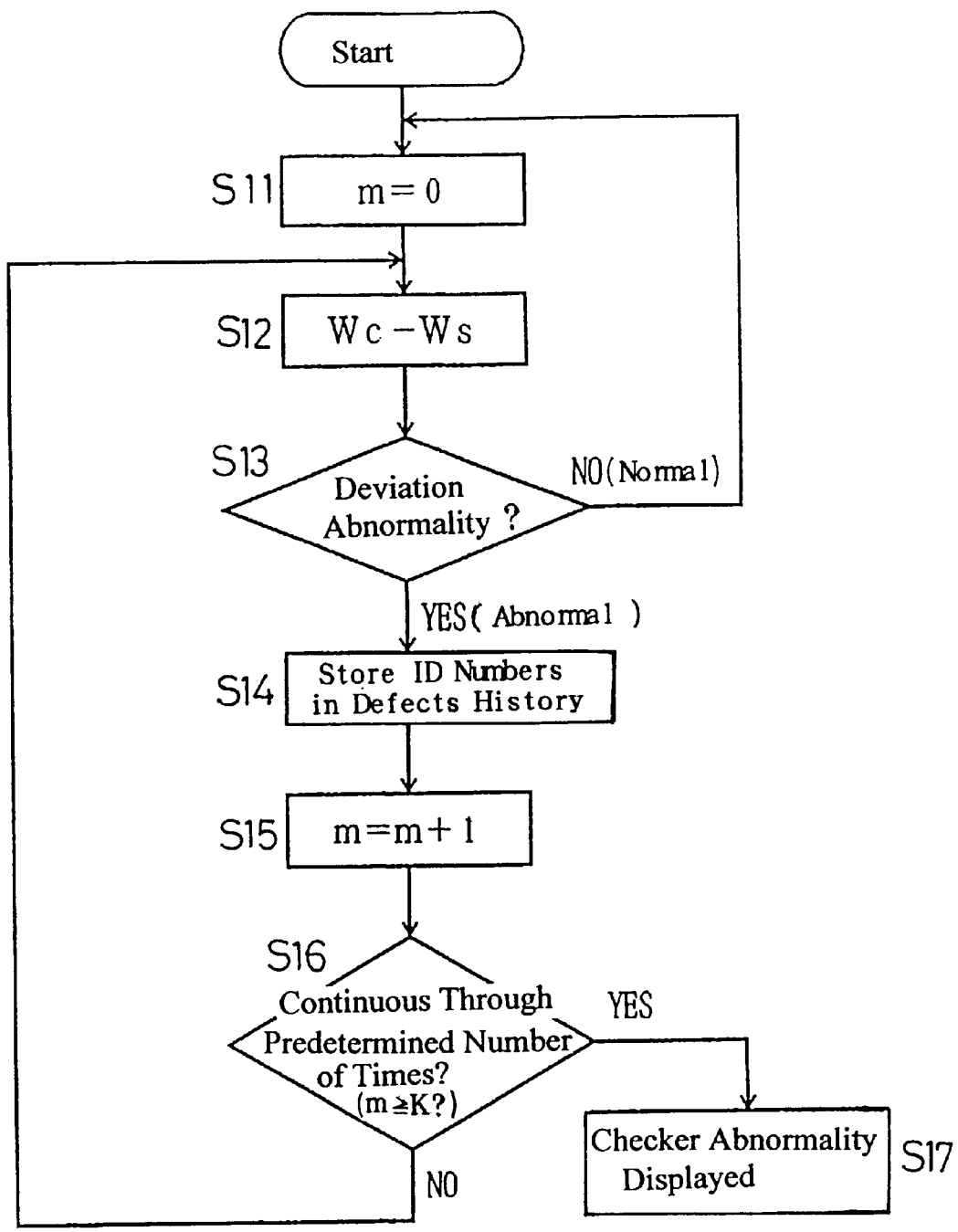
FIG. 15 is a flowchart showing an abnormal device determining mode executed in the third embodiment of the present invention.

FIGS. 13 to 15 illustrate a third preferred embodiment of the present invention.

In this embodiment, component parts shown therein and similar to those in the first preferred embodiment of the present invention are designated by like reference numerals and the details thereof are not reiterated for the sake of brevity.

Referring to FIG. 13, the combination controller 10 to which weight signals are inputted includes a central processing unit (CPU) 11, a read-only memory (ROM) 12 and a random access memory (RAM) 13. The RAM 13 includes a first measurement history storage 13a. As shown in FIG. 14A, the first measurement history storage 13a stores the identification numbers of some of the weighing heads selected in the combination calculation and the combination calculated values Wc of the combination calculation in a fashion associated with each other.

The structure of an important portion of the system according to this embodiment will now be described.

As shown in FIG. 13, the combination controller 10 and the weight checker control unit 30 are connected with a remote controller 50 through an interface now shown.

The remote controller 50 includes a central processing unit (CPU) 51, a read-only memory (ROM) 52 and a random access memory (RAM) 53. The RAM 53 includes a third measurement history storage 53a, a defects history storage 53b, a tolerance range storage 53c and a times storage 53f. The third measurement history storage 53a is fed (inputted) with the contents stored in the first measurement history storage 13a of the combination controller 10 and the post-discharge measured value Ws and stores the combination calculated value Wc and the post-discharge measured value Ws for the same contents in a fashion associated with each other. In other words, the third measurement history storage 53a stores contents corresponding to the contents stored in the first measurement history storage 13a (FIG. 4A) of the combination controller 10 (FIG. 3) used in the first embodiment of the present invention.

The tolerance range storage 53c shown in FIG. 13 stores therein, for example, a predetermined tolerance difference (tolerance range) We. The CPU 51 of the remote controller 50 constitutes an abnormal device determining means of the weighing system and performs a comparison of the weight deviation, obtained by subtracting the post-discharge measured value Ws of the same product M1, which has been subjected to the combination calculation, from the combination calculated value Wc, with the tolerance difference We. The CPU 51, when the absolute value of the weight deviation is larger than the tolerance difference We, determines the presence of a deviation abnormality (displacement abnormality) and then causes the defects history storage 53b to store the identification number of the weighing heads selected in such combination calculation as shown in FIG. 14C.

The times storage 53f stores a predetermined value K that is used as a reference of whether continued or not. The CPU 51 shown in FIG. 13 is provided with a counter 51a similar to the counter 11a (FIG. 3) employed in the first preferred embodiment of the present invention.

The remote controller 50 is connected with a touch screen 54 similar to the touch screen 14 (FIG. 3) employed in the first embodiment of the present invention through an interface now shown.

Hereinafter the principle of identifying the defect machine and its operation according to this embodiment will be described, it being, however, to be noted that only a portion that differs from the first embodiment of the present invention will be described for the sake of brevity.

As shown in FIG. 14C, in the event that the deviation abnormality occurs in the "first time", "third time" and "fourth time", the deviation abnormality appears discontinuously and, therefore, the CPU 51 determines that the weighing head is abnormal. This determining process corresponds to the determining process at step S5 shown in FIG. 6 in connection with the first embodiment of the present invention.

In this embodiment, as will be described subsequently, depending on whether the deviation abnormality appears continuously or discontinuously, determination of an abnormal device is carried out.

The sequence of operation of the CPU 51 (abnormal device determining means) will be described with reference to the flowchart shown in FIG. 15.

Subsequent to start of the abnormal device determining mode, and at step S11, the counter 51a (FIG. 13) is cleared to zero, followed by step S12. At step S12, the CPU 51 associates the identification numbers of the weighing heads selected in the combination calculation and the post-discharge measured values Ws of the same products M1 subjected to the combination calculation with each other and cause them to be stored in the third measurement history storage 53a. On the other hand, the CPU 51 calculates a weight deviation, followed by step S13.

At step S13, the CPU 51 compares the weight deviation with the tolerance difference We and proceeds to step S14 in the event of determination of the deviation abnormality. On the other hand, in the case of no deviation abnormality, the program flow returns to step S11. At step S14, the CPU 51 causes the defects history storage 53b to store the identification numbers of the weighing heads selected in the combination calculation, followed by step S15.

At step S15, the counter 51a is incremented, followed by step S16. At step S16, the count of the counter 51a is compared with the predetermined value K. If the count of the counter 51a is larger than the predetermined value K, it means that the deviation abnormality is repeated a predetermined time (the deviation abnormality appears continuously) and, therefore, it is determined that there is a possibility that the weight checker 300 is abnormal, followed by step S17. On the other hand, if the count of the counter 51a is smaller than the predetermined value K, the program flow returns to step S12. At step S17, a message "Is any abnormality occurring in the weight checker?" is displayed on the touch screen 54.

Figure 16:
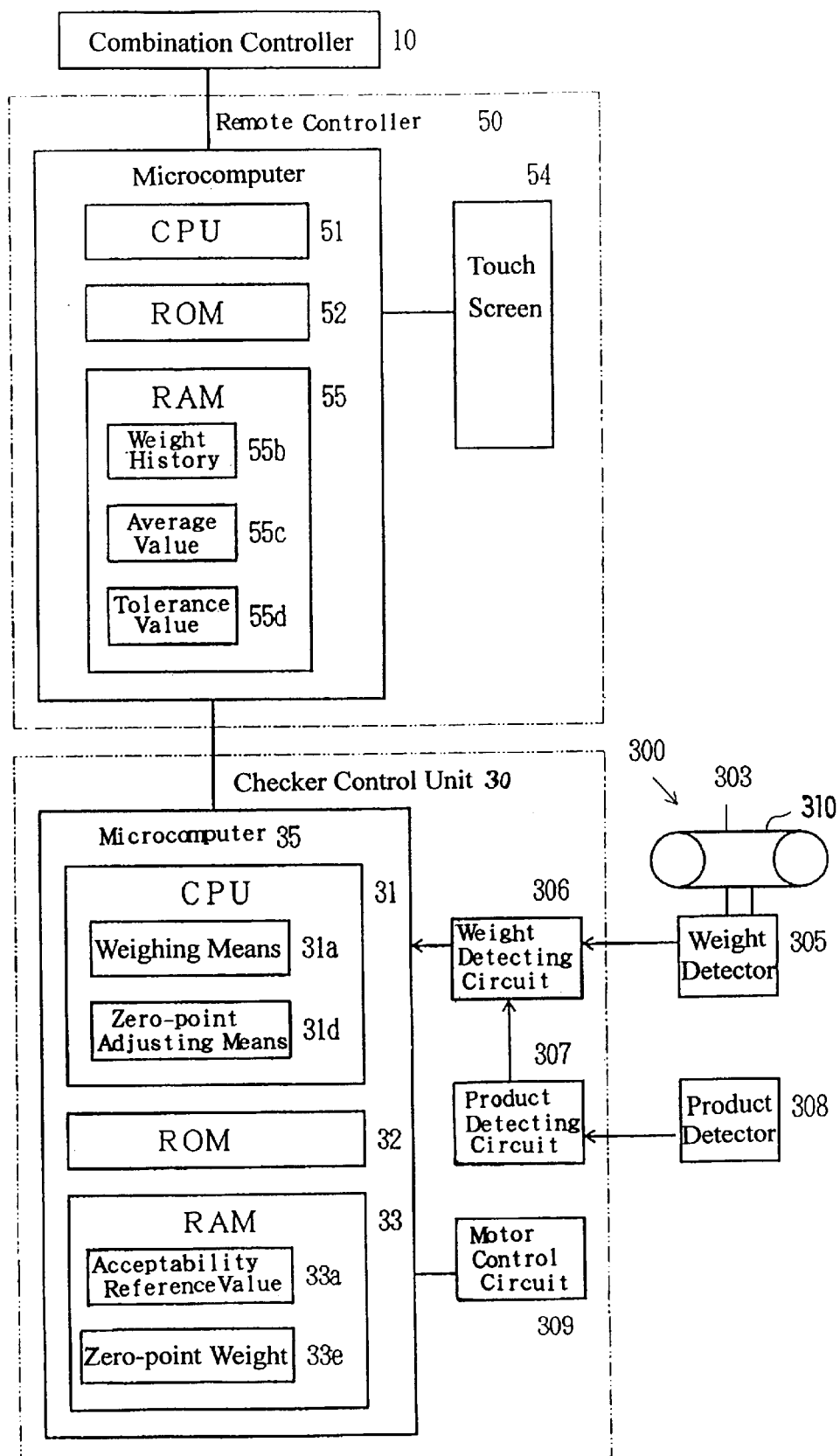
FIG. 16 is a schematic structural diagram showing an important portion of a fourth preferred embodiment of the present invention.

FIG. 16 illustrates a fourth preferred embodiment of the present invention.

While in the third embodiment of the present invention, the abnormal machine has been determined depending on whether or not the deviation abnormality occurs continuously, the fourth embodiment of the present invention is such that the determination of the abnormal machine is determined depending on a value obtained by averaging information on a plurality of deviations.

It is to be noted that component parts shown therein and similar to those in the second or third preferred embodiment of the present invention are designated by like reference numerals and the details thereof are not reiterated for the sake of brevity.

As shown in FIG. 16, the combination controller 10 and the checker control unit 30 are connected with the remote controller 50 through an interface not shown.

The checker control unit 30 includes a microcomputer 35, a weight detecting circuit 306, a product detecting circuit 307 and a motor control circuit 309.

The RAM 33 of the microcomputer 35 is provided with an acceptability reference value storage 33a and a zero-point weight storage 33e.

The CPU 31 of the checker control unit 30 is provided with a weighing means 31a and a zero-point adjusting means 31d.

The RAM 55 of the remote controller 50 is provided with a weight history storage 55b, an average value storage 55c and a tolerance value storage 55d, which store respective contents corresponding to the associated contents stored in the weight history storage 33b, the average value storage 33c and the tolerance value storage 33d employed in the second embodiment of the present invention shown in FIG. 9, respectively. The combination calculated value Wc is inputted from the combination controller 10 and the post-discharge measured value Ws is inputted from the checker control unit 30 each time the weight measurements are carried out and are then updated and stored in the weight history storage 55b.

In this embodiment, the CPU 51 of the remote controller 50 calculates the combination average value Wa and the post-discharge measured average value Wb.

The CPU 51 of the remote controller 50 constitutes the abnormal machine determining means of the present invention and is operable to determine the combination average value Wa and the post-discharge measured average value Wb and then subtract the post-discharge measured average value Wb from the calculated combination average value Wa to thereby calculate the measurement deviation (Wa−Wb). Also, this CPU 51 compares the absolute value of the measurement deviation (Wa−Wb) with the tolerance value Wp and determines if there is a possibility of occurrence of the zero-point defect depending on the result of the comparison.

In addition, the CPU 51 compares the result of the zero-point adjustment with the measurement deviation (Wa−Wb) to determine if it is the zero-point defect.

The combination controller 10 when receiving a break signal similar to that in the second embodiment from the remote controller 50, causes the combination weighing apparatus 1 to break the combination discharge of the contents M for one time.

The operation of the present invention according to this embodiment differs from that according to the second embodiment in that in this embodiment since the abnormal machine determining means (the zero-point defect determining means) is constituted by the CPU 51 of the remote controller 50, comparison at each of steps S21 and S24 in the flowchart of FIG. 11 and calculation at step S23 in the flowchart of FIG. 11 are executed by the CPU 51 of the remote controller 50, not by the CPU 31 of the checker control unit 30. With respect to the zero-point adjustment at step S22 of the flowchart of FIG. 11, the CPU 51 issues a zero-point adjustment command according to which the checker control unit 30 executes the zero-point adjustment.

FIGS. 17A and 17B illustrates a modified form of the abnormal machine determining method.

The Ram 55 of the remote controller 50 is provided with a deviation history storage 55f. This deviation history storage 55f stores a deviation Wd obtained by subtracting the post-discharge measured value Ws from the combination calculated value Wc of the same contents. The CPU 51 of the remote controller 50 determines the deviation Wdi from two values Wci and Wsi and causes the deviation Wdi to be stored in the RAM 55. The CPU 55 then determines if deviations Wdn to Wd1 for the n-times, that is, the "devia-tions" continue in a similar fashion. For this purpose, the following equations (1) and (2) are employed:

$$Wd1 \leq Wd2 \leq \ldots \leq Wdn \quad (1)$$

$$Wd1 \geq Wd2 \geq \ldots \geq Wdn \quad (2)$$

In other words, since change of the zero-point of the weight checker generally gradually expands with passage of time, where the deviation Wdi stored in the deviation history storage 55f gradually increases or decreases as shown in FIG. 17A (i.e., either one of the equations (1) and (2) is satisfied), the CPU 51 determines that the cause of the deviation abnormality lies in the variation of the zero-point in the weight checker 300.

On the other hand, where as shown in FIG. 17B the deviation Wdi stored in the deviation history storage 55f increases or decreases randomly (i.e., none of the equations (1) and (2) is satisfied), the CPU 51 determines that the cause of the deviation abnormality exist anywhere else.

A fifth preferred embodiment of the present invention is shown in FIGS. 18 to 28.

The outline of the weighing, packaging and inspecting system according to this embodiment will be described.

Referring to FIG. 18, as is the case with any one of the first to fourth embodiments of the present invention, reference numeral 100 represents a delivery conveyor; reference numeral 1 represents a combination weighing apparatus; reference numeral 200 represents a bagging and packaging machine (packaging machine); reference numeral 300 represents a weight checker (weighing conveyor); reference numeral 400 represents a seal checker; and reference numeral 700 represents a boxing machine.

The details of each of the combination weighing apparatus 1 and that of the weight checker 300 have been described in connection with those used in any one of the first to fourth embodiments of the present invention and are not therefore reiterated for the sake of brevity.

The details of the bagging and packaging machine 200 will now be described with reference to FIG. 19.

Figure 19:
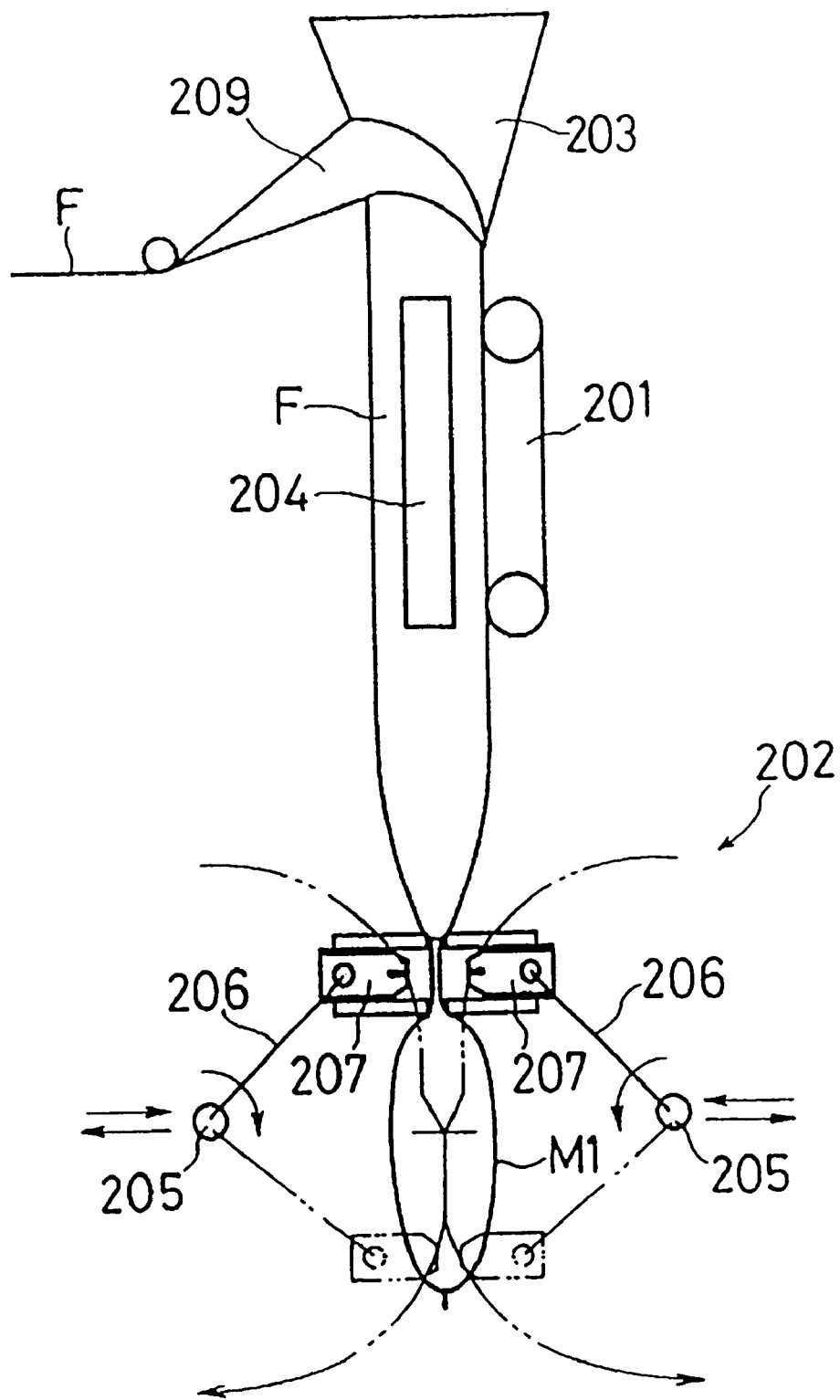
FIG. 19 is a schematic side view showing one example of the bagging and packaging machine.

Referring to FIG. 19, a web of film F is shaped into a tubular form by a former 209. The bagging and packaging machine 200 is so structured that while a pull-down belt 204 positioned beneath the former 209 and holding a side surface of the web of film F by the effect of a suction force pulls the web of film F downwardly, the vertical sealer 201 positioned laterally of the pull-down belt 204 seals opposite ends of the web of film F with respect to the direction of flow of the web of film F to thereby shape the web of film F into the tubular form.

An end sealer 202 includes rotary shafts 205, arms 206 and sealing jaws 207. The end sealer 202 is so structured that as the rotary shafts 205 undergo a reciprocating motion in a horizontal direction at a predetermined timing while the arms 206 rotate continuously in respective directions opposite to each other, the sealing jaws 207 at free ends of the arms 206 move so as to depict a generally D-shaped path.

Figure 20:
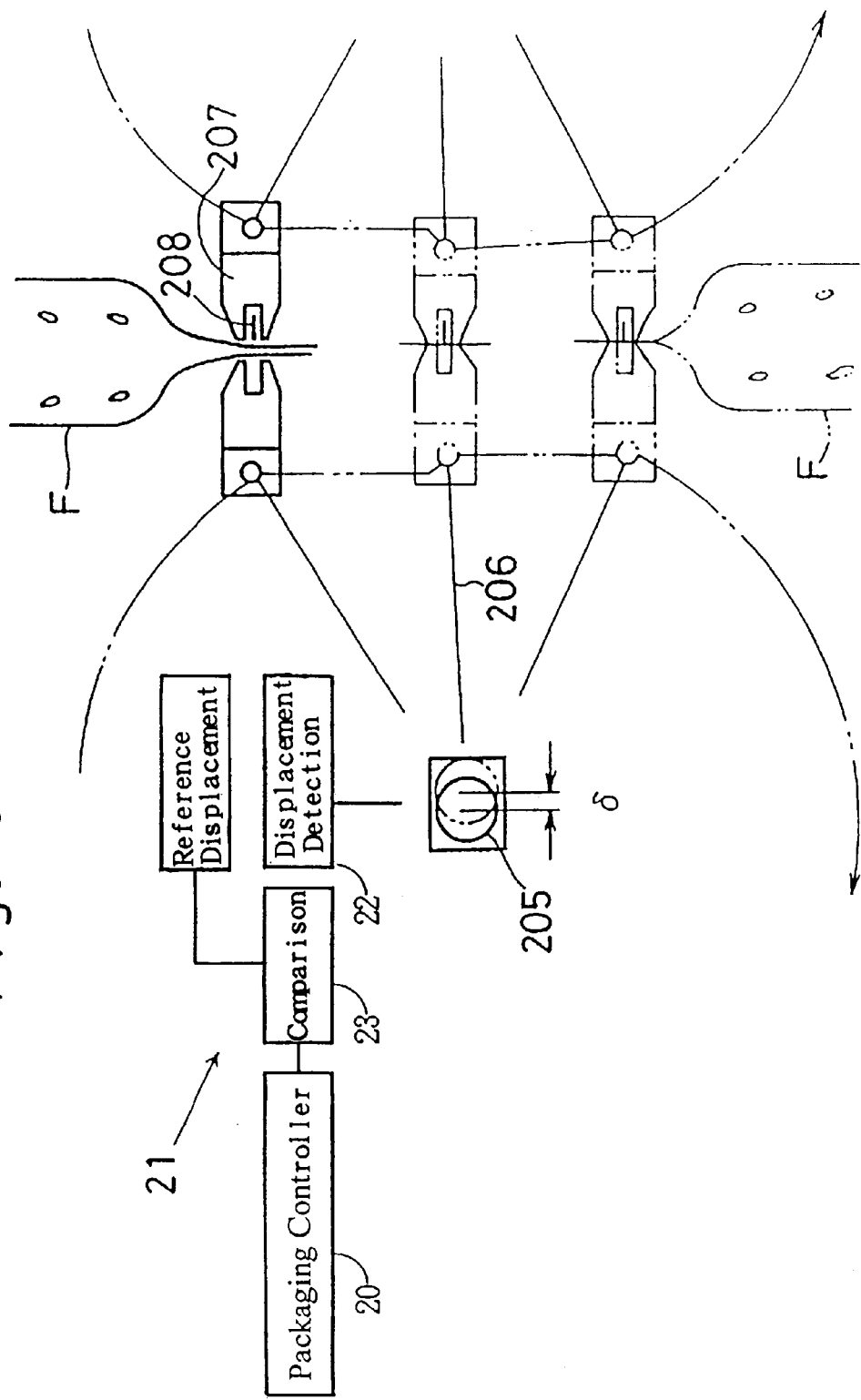
FIG. 20 is a schematic structural diagram showing one example of a poker.

The sealing jaws 207 shown in FIG. 20 when receiving a discharge completion signal from the combination weighing apparatus 1 start their rotation and, when they rotate to a position where they abut against each other, they move generally linearly in a downward direction while stripping off the web of film F, to thereby clamp and seal an end of the web of film F (an end of the product M1 in a vertical direction), and then descend, and thereafter the sealed end of the web of film F is cut by a cutter 208. After the cutting of the sealed end of the web of film F, the sealing jaws 207 return to the original position while depicting a circular path.

It is to be noted that the rotary shafts 205 are rotated and driven to reciprocate by respective servomotors.

Hereinafter, a bite detecting means 21 will be described.

The bite detecting means 21 includes a detecting head 22 provided in the seal jaws 207 for detecting a displacement δ (information on the distance) of the distance between the paired seal jaws 207 and 207 during the sealing operation and a comparing means 23 for comparing the detected displacement with a reference displacement. Depending on whether the displacement δ is larger or smaller than the reference displacement, whether or not the product M is bitten in the sealed end of the web of film F (a sealed portion) can be detected, and a result of detection is then outputted to a packaging controller 20.

Figure 21:
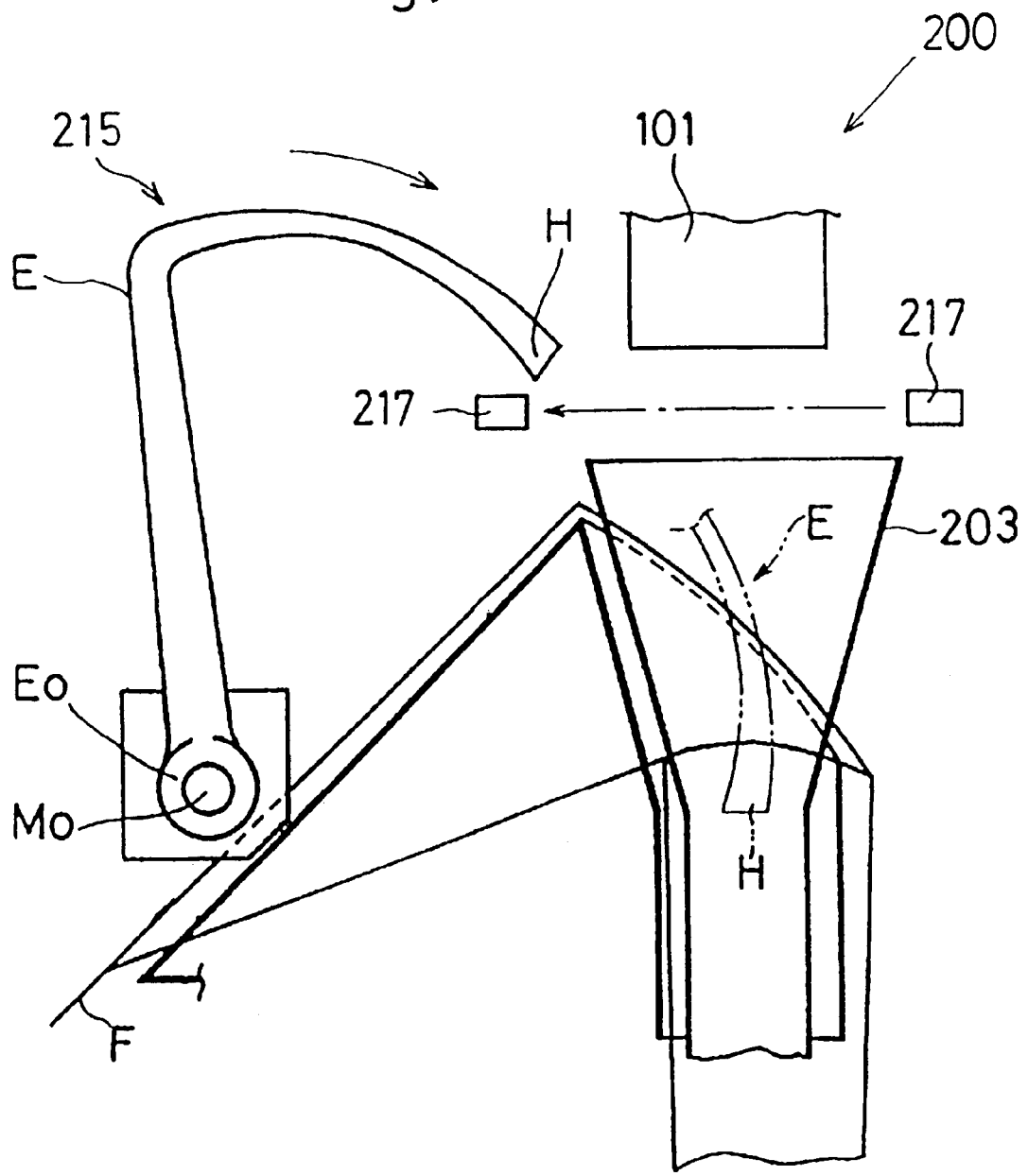
FIG. 21 is a schematic structural diagram showing the poker.

As shown in FIG. 21, the bagging and packaging machine 200 is provided with a poker (an auxiliary device) 215 for facilitating or improving the flow of the contents M. This poker 215 includes a generally L-shaped arm E having a free end provided with a clapper H. A base Eo of the arm E is rigidly connected with an output shaft of a motor through a reduction gear unit not shown. By rotation of the motor, the arm E can move angularly from an initial position, shown by the solid line, to an operative position shown by the double-dotted line, the clapper H projects into a chute 203 to clap the contents M within the chute 203 so that the contents M can fall downwards, thereby facilitating or improving the flow of the contents M. Such a poker 215 is disclosed in, for example, the Japanese Utility Model Publication No. 3-1362, the disclosure of which is herein incorporated by reference.

Figure 22A:
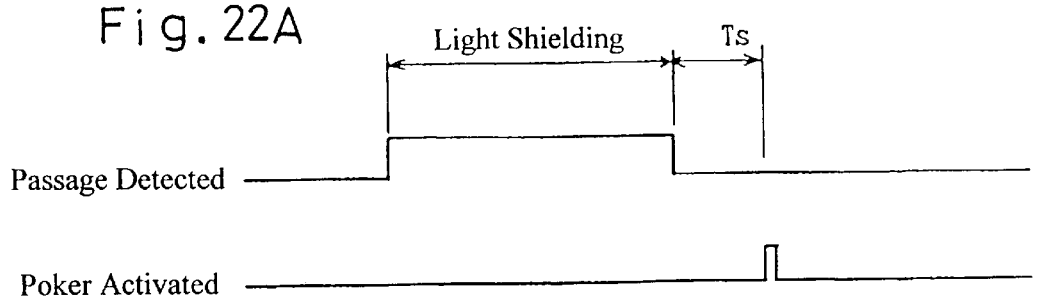
FIGS. 22A to 22C are timing charts showing operating timings of the poker.

A passage detector 217 is disposed between the chute 203 and a discharge chute 101. This passage detector 217 comprises an area sensor having a line-type photo-detector for detecting the contents M. As shown in FIG. 22A, after the passage detector 217 has detected the contents M, and at the timing a predetermined time Ts after the passage detector 217 has no longer detected the contents M, the poker 215 is activated.

The product M1 packaged as shown in FIG. 18 falls downwards and is, after having been laid by the knock-down member 301, transported. The product M1 is subsequently transferred from the receiving conveyor 302 onto the weight checker 300.

Figure 23:
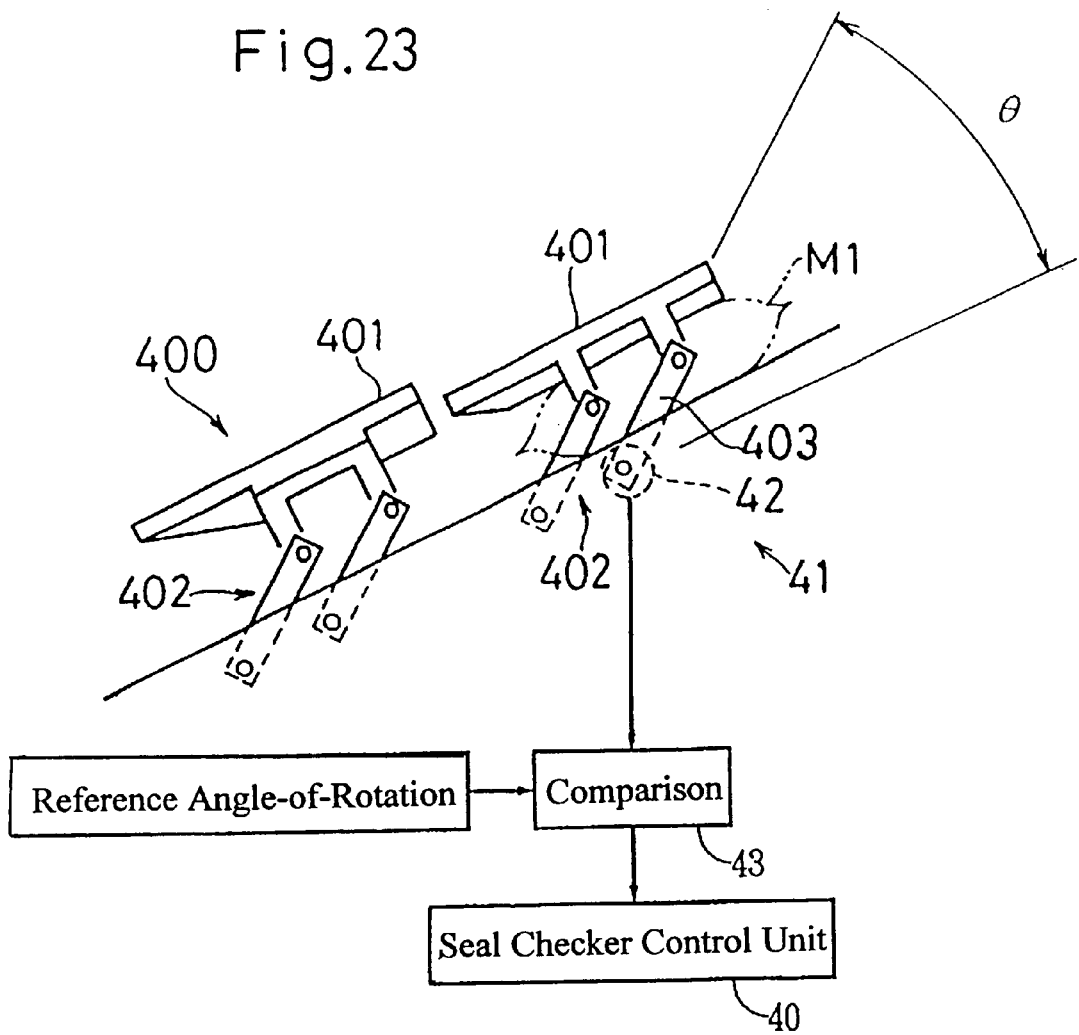
FIG. 23 is a schematic structural diagram showing one example of a seal checker.

With reference to FIG. 23, the details of a seal detecting means 41 provided in the seal checker 400 will now be described.

The retainer member 401 of the seal checker 400 is mounted on a parallel motion mechanism 402 for rotation through a predetermined angle such that when the product M1 is advanced, the retainer member 401 can be somewhat diagonally upwardly shifted and then fall by gravity under its own weight to suppress a bag of the product M1. An angle-of-rotation detector 42 such as, for example, a rotary encoder is provided at a center of rotation of a lower end of one of links 403 constituting the parallel motion mechanism 402. The angle-of-rotation detector 42 outputs to the comparing means 43 the angle of rotation θ of the links 403. Accordingly, the comparing means 43 compares the inputted angle of rotation θ with a predetermined reference angle of rotation to determine the acceptability of the seal of the product M1. Specifically, if the detected angle of rotation θ is smaller than the predetermined reference angle of rotation, it is determined that air leaks from the bag and, therefore, a seal defect signal is outputted to the seal checker control unit 40 as the result of detection.

The control structure of the system according to this embodiment will be described with reference to FIG. 24.

The combination controller 10, the packaging controller 20, the weight checker control unit 30 and the seal checker control unit 40 are connected with a remote controller 50 separate from the various control units 10, 20, 30 and 40 through a communication network so that they can operate in association with each other. The remote controller 50 includes a central processing unit (CPU) 51, a read-only memory (ROM) 52 and a random access memory (RAM) 53. The remote controller 50 is integrated together with a touch screen display (a warning means) 54 and a stroke key unit 59 and is connected with an alarming means 55. It is to be noted that the alarming means 55 may be employed in the form of a signaling light and/or a buzzer.

The CPU (an abnormality diagnosing determining means) 51 refers to the process at each step of the various machines with respect to the same contents M or the same products M1 to diagnose the contents of the abnormality occurring at such step and outputs the result of the diagnosis through the touch screen 54 and the alarming means 55.

It is to be noted that the remote controller 50 is preferably installed at a location adjacent the bagging and packaging machine 200. This is because adjustment of the bagging and packaging machine 200 is generally most difficult to achieve and, for this reason, the workability can be increased if the bagging and packaging machine 200 is adjusted while looking at the touch screen 54 of the remote controller 50.

The combination control of the combination control device will now be described.

Figure 25A:
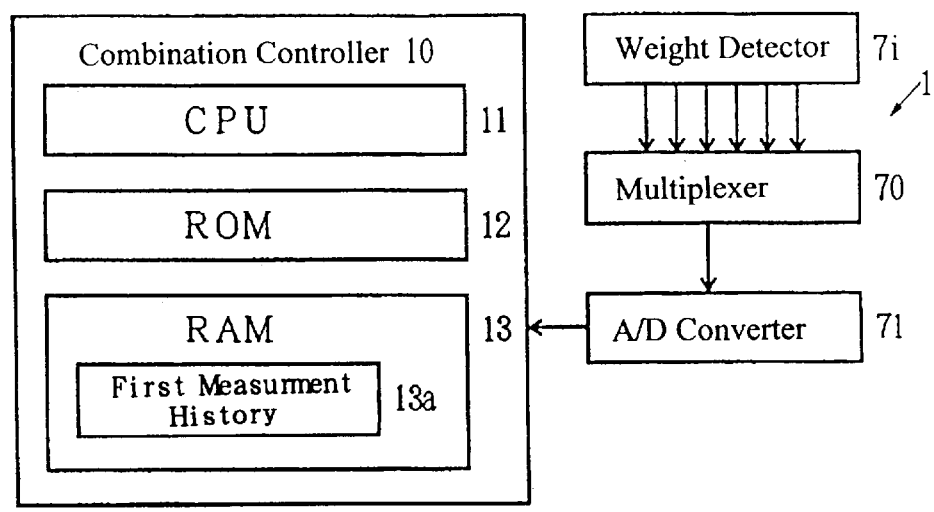
FIG. 25A is a schematic structural diagram of a combination controller and others employed in the fifth embodiment of the present invention.

The combination controller 10 shown in FIG. 25A includes the CPU 11, the ROM 12 and the RAM 13. The RAM 13 includes the first measurement history storage 13a in which the contents shown in FIG. 14A is stored as is the case with that in the third embodiment of the present invention.

Figure 25B:
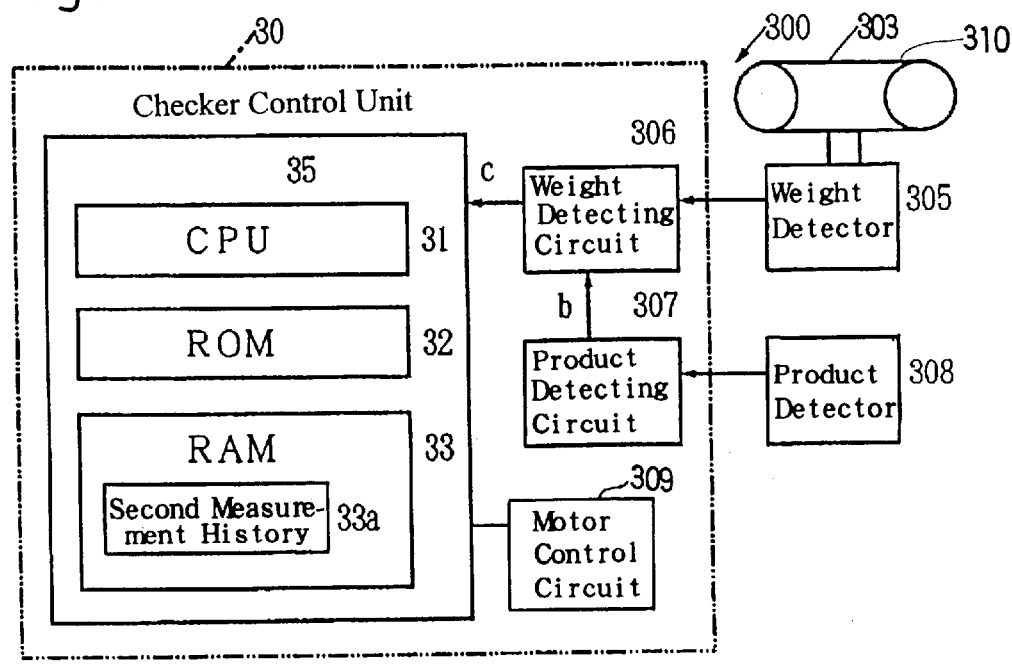
FIG. 25B is a schematic structural diagram showing a checker control unit and others employed in the fifth embodiment of the present invention.

As shown in FIG. 25B, the checker control unit 30 includes a microcomputer 35, a weight detecting circuit 306 and a product detecting circuit 307.

When a product detector 308 detects the product M1, the product detecting circuit 307 shown in FIG. 25B provides the weight detecting circuit 306 with a product detection signal b at a timing matching with the timing of detection of the product M1. Based on the product detection signal b, the weight detecting circuit 306 provides the microcomputer 35 at a predetermined timing with a weight signal c which corresponds to the measured signal from which a vibration component has been eliminated. Based on the weight signal c, the microcomputer calculates the weight of the contents M of the product M1, that is, the post-discharge measured value Ws.

The post-discharge measured value Ws so calculated is stored in the second measurement history storage 33a of the checker control unit 30.

Figure 24:
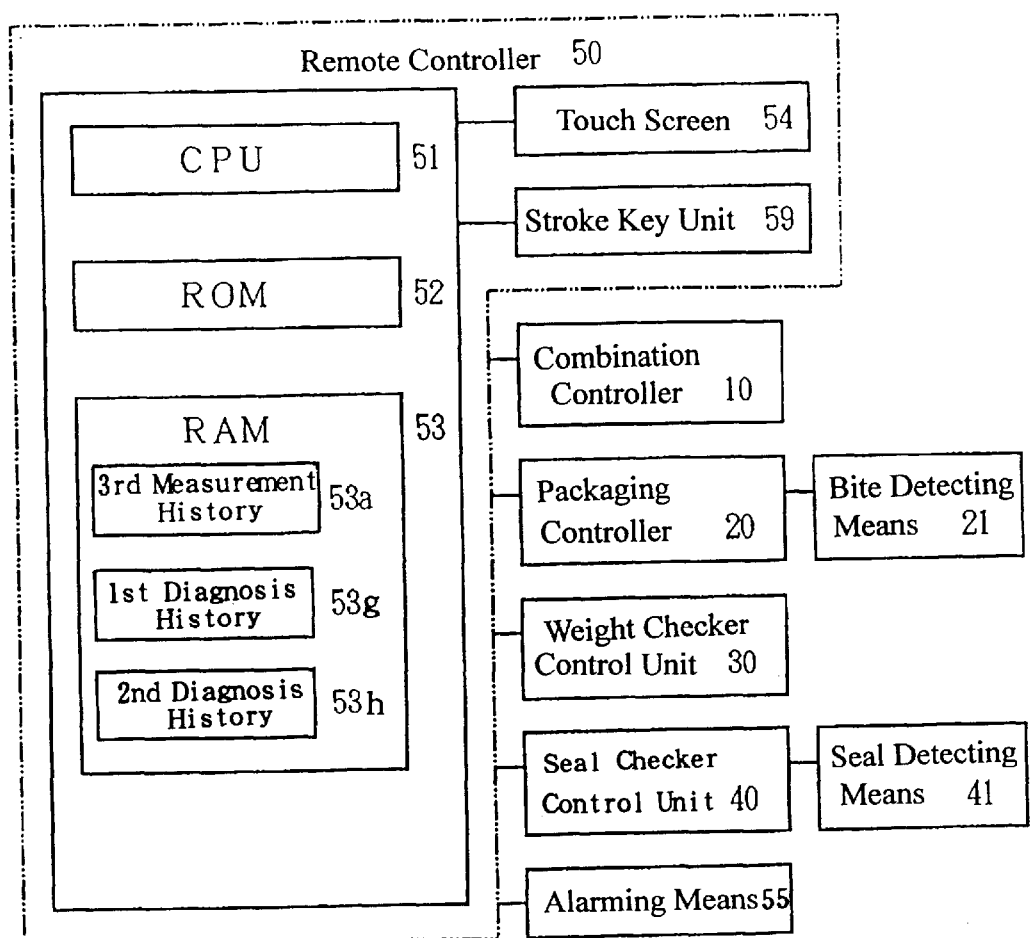
FIG. 24 is a schematic structural diagram showing a control device for the system according to the fifth embodiment of the present invention.

The RAM 53 of the remote controller 50 shown in FIG. 24 has a third measurement history storage 53a built therein. This third measurement history storage 53a is transferred with the contents stored in the history storages 13a and 33a of the respective combination controller 10 and the checker control unit 30 and stores the combination calculated value Wc and the post-discharge measured value Ws of the same product as is the case with the third measurement history storage 53a employed in the third embodiment of the present invention as shown in FIG. 14B.

Also, the RAM 53 of the remote controller 50 shown in FIG. 24 is provided with first and second diagnosis history storages 53g and 53h.

As shown in FIG. 26A, the first diagnosis history storage 53g stores not only results of detection by the bite detecting means 21 and results of inspection performed by the seal checker 400, both having been transferred through the communication network, but also results of diagnosis performed based on those results of detection and inspection.

On the other hand, as shown in FIG. 26B, the second diagnosis history storage 53h stores not only results of inspection by the weight checker 300 and the seal checker 400, which have been transferred through the communication network, but also results of diagnosis performed based on those results of detection and inspection.

The contents shown in FIGS. 14A to 14C in connection with the third embodiment of the present invention, the processing contents and inspection results of the various devices (steps) 1 and 200 to 400 shown in FIG. 26, and the result of diagnosis are displayed on the touch screen 54 shown in FIG. 24.

The touch screen 54 and the stroke key unit 59 altogether constitute a data input device for each of the apparatuses 1 and 200 to 400 as shown in, for example, FIGS. 27A and 27B and FIGS. 28A and 28B.

The touch screen 54 as the input device will now be described.

Figure 27A:
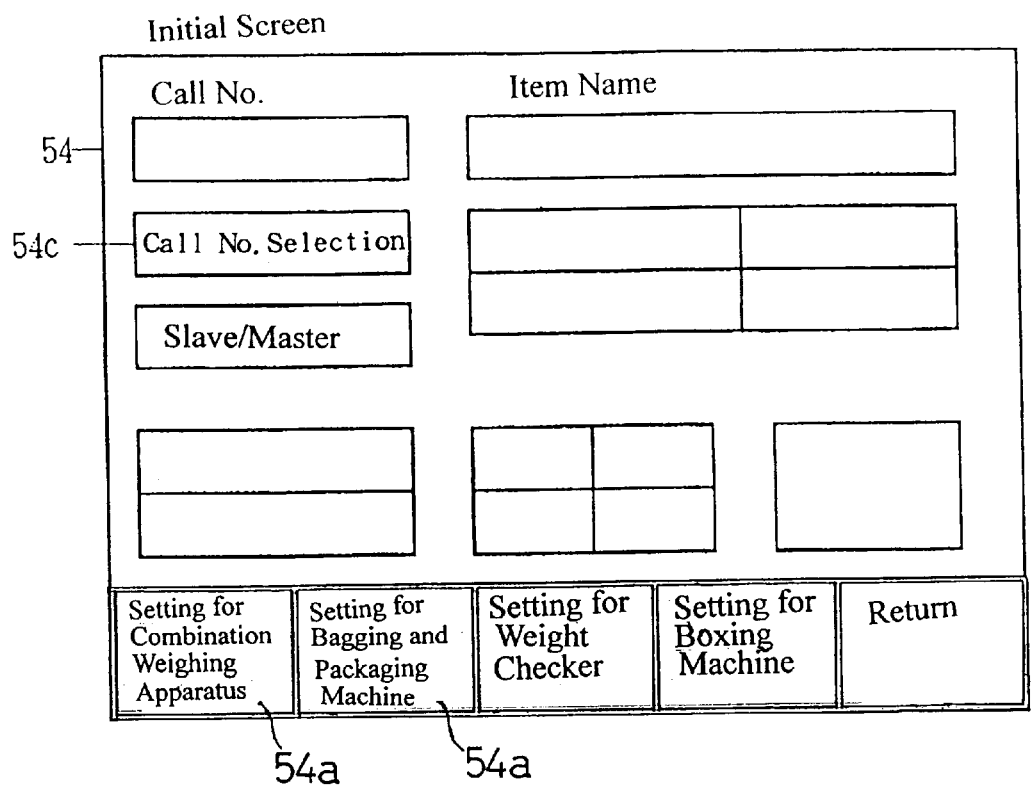
FIGS. 27A and 27B are front elevational views of a touch screen employed in the fifth embodiment of the present invention, showing different messages displayed thereon, respectively.
Figure 27B:
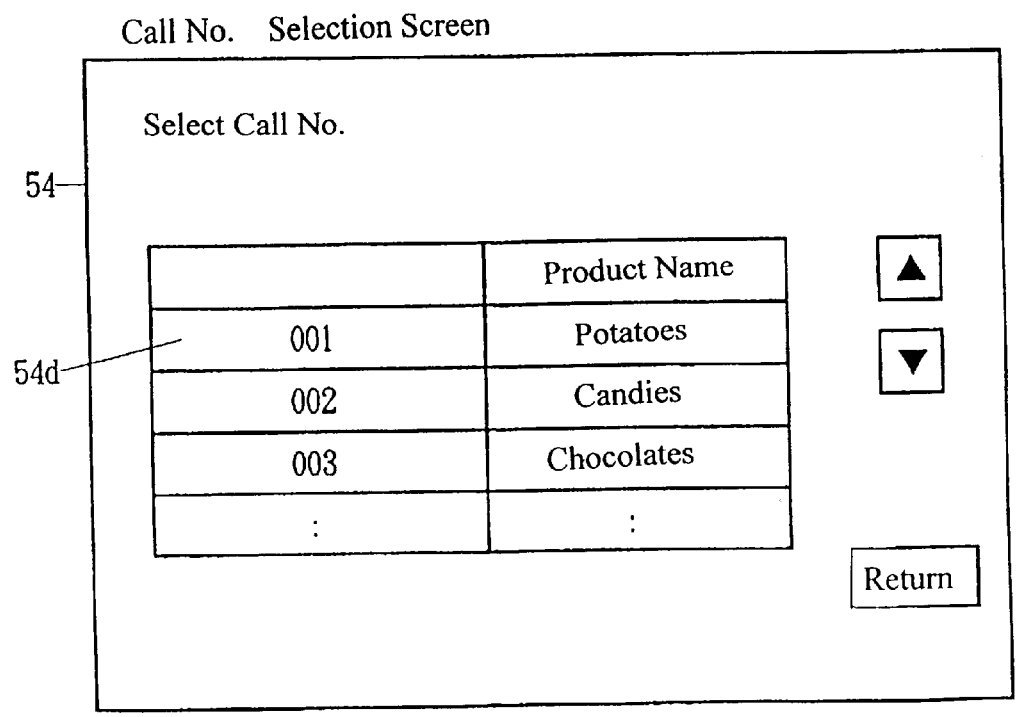

Through a predetermined manipulation, an initial menu shown in FIG. 27A is displayed on the touch screen 54. Then, when a "Call No. Select" button 54c is touched after a device setting button 54a has been touched, a "Call No. Select" menu shown in FIG. 27B is displayed. In this displayed menu, when an arbitrary "Call No." button 54d is touched to select a product, set menu for each device is displayed as shown in FIGS. 28A and 28B. In these displayed set menu, when a "Bag Number" button 54b is touched followed by inputting of a number through the stroke key unit 59 (FIG. 24), operating conditions such as the number of bags are inputted.

In the description that follows, the functions of the CPU 51 will be illustrated.

The function of diagnosing the abnormality contents occurring at the various steps and others will be described.

One of the abnormalities includes stagnation of the product on the conveyor 302 shown in FIG. 18. A method of detecting this stagnation will now be described.

After the product M1 has been discharged from the bagging and packaging machine 200, and unless such product M1 stagnates at the fall-on position P1 or elsewhere, the product M1 is transported and detected by the product detector 308. Accordingly, unless the product detector 308 detects the product M1 even when a predetermined length of time from the timing of discharge of the product M1 to the timing of arrival at the detection position P2 has passed, the CPU 51 determines the occurrence of stagnation of the product on the way it is transported and operates to display such situation and/or to halt the devices upstream of the weight checker 300.

Also, as shown and described in connection with any one of the first and third embodiments of the present invention, the weighing defect may occur as a result of occurrence of inconvenience in a specific one of the weighing hoppers 6i (FIG. 2). The manner by which the identification number of such one of the weighing hoppers 6i is specified is such as hereinbefore described.

Based on the information on the identification numbers of the hoppers selected in the combination calculation at the time of occurrence of the deviation abnormality, the CPU 51 does not only identify, but also display the identification number of one of the hoppers which is possibly abnormal so that the operator can be readily informed of the identification number of the hopper in which the inconvenience has occurred and, therefore, a job of restoration of the system can easily and quickly be performed.

The manner in which the operating timing (hereinafter referred to as "sealing timing") of the end sealer 202 shown in FIG. 19 and the operating timing (hereinafter referred to as "ramming timing") of the poker 215 are changed will be hereinafter described.

If the weight defects of the products M1 are repeated a predetermined number of times, there is a possibility that the sealing timing has deviated. In other words, it is suspected that before the last contents M of the preceding group of the contents M arrive at a predetermined level the sealing operation is carried out and such last contents M mix into the next bag, resulting in shortage or surplus of the weight of the product M1 occurring repeatedly. Accordingly, the CPU 51 operates the system while delaying the sealing timing a predetermined length of time, performs determination of whether or not the weight defects during a predetermined number of subsequent measurement occur repeatedly, and repeats control of further delaying the sealing timing (a feed-back control) until the weight defects are removed. In this way, the weight defects of the products M1 can be eliminated.

Figure 22B:
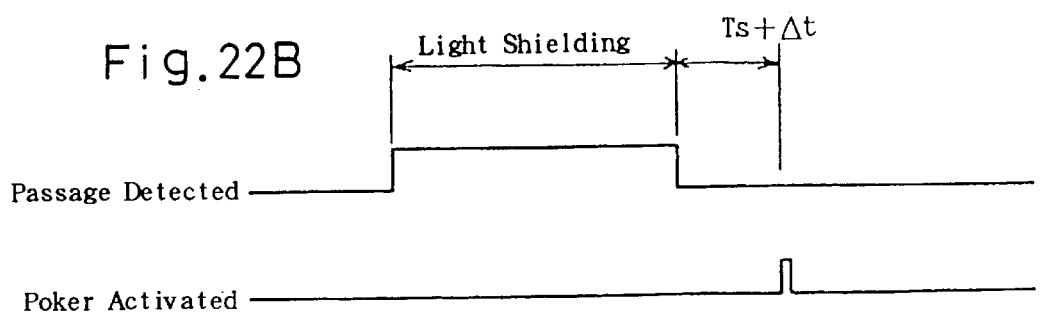
Figure 22C:
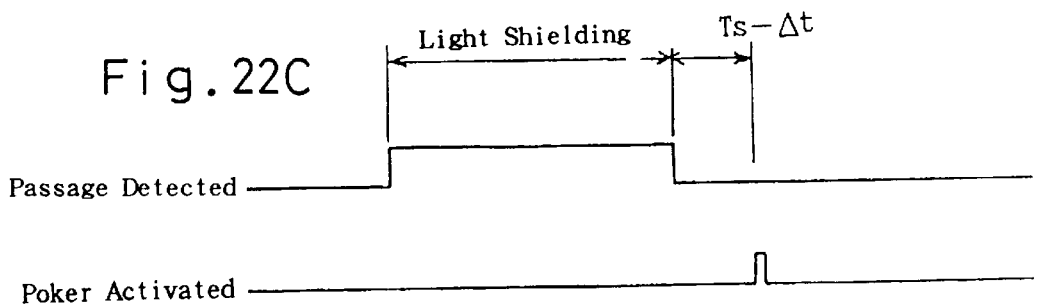

In the meantime, in the event that the weight defects occur repeatedly, there is likelihood that, other than the deviation of the sealing timing, the ramming timing is deviated. Accordingly, where the weight defects cannot be removed even if change of the sealing timing is carried out a predetermined number of times according to the previously described method, change of the ramming timing is carried out as shown in FIGS. 22B and 22C. In other words, the CPU 51 operates the system while changing the ramming timing, performs determination of whether or not the weight defects during a predetermined number of subsequent measurement occur repeatedly, and repeats the change of the ramming timing (a feed-back control) until the weight defects do no longer occur. In this way, the weight defects of the products M1 can be eliminated.

Thus, if the system is automatically improved, the productivity of the system and others can be increased.

Other diagnosing functions of the CPU 51 will now be described.

As shown in FIG. 26A, based on the results of detection and inspection of the same product M1 by the bite detecting means 21 and the seal detecting means 41, respectively, the CPU 51 diagnoses (determines) if the sealers 201 and 202 are functioning properly.

By way of example, if with respect to the same product M1 biting is detected by the bite detecting means 21 and the result of inspection by the seal detecting means 41 is non-acceptable, the CPU 51 determines that there is a problem in the sealing timing of the end sealer 202 and causes such result of diagnosis to be stored in the first diagnosis history storage 53g and, also, to be displayed on the touch screen 54 and activates the alarming means 55. In such case, the touch screen 54 displays a message "Biting detected and Leakage occurred. Try to change the sealing timing of the end sealer."

As will be described subsequently, the CPU 51, based on the result of inspection of the weight defects in the same product M1 and the result of inspection of the seal detecting means 41, diagnoses the abnormal condition and the abnormality of the sealers 201 and 202 and outputs the result of diagnosis through the touch screen 42 and the alarming means 55.

By way of example, as shown in FIG. 26B, in the event that the inspection by the seal checker 400 indicates nonacceptability and occurrence of the unacceptable weight, it is diagnosed that the timing of biting by the sealing jaws 207 of the end sealer 202 shown in FIG. 19 is deviated with respect to the fall of the contents M, and the result of diagnosis is not only stored in the second diagnosis history storage 53h shown in FIG. 26B but also displayed on the touch screen 54. In such case, the touch screen 54 displays, for example, a message "Seal checker Defect·Weight Defect Occurred→Check to see the sealing timing of the end sealer."

Other abnormalities which would occur in the system may include the following situations.

By way of example, if the weight checker 300 indicates the post-discharge measured value Ws that is short of the target weight even though the combination weighing apparatus 1 shown in FIG. 18 has discharged the contents M which have attained the target weight, it can be suspected that clogging of the contents M would have occurred in the chute 203. Accordingly, the remote controller 50 brings the combination weighing apparatus 1 and the bagging and packaging machine 200 to a halt.

Also, if shortage or surplus of the post-discharge measured value Ws given by the weight checker 300 slowly change with passage of time even though the combination calculated value Wc given by the combination calculating apparatus 1 is close to the target weight, the packaging operation of the bagging and packaging machine 200 is halted and during that time the zero-point adjustment of the weight checker 300 is carried out as described in connection with any one of the second and fourth embodiment of the present invention.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in the first embodiment of the present invention the tolerance range storage 13c has been described as incorporated in the RAM 13, it may be stored in a program stored in the ROM 12. Also, although in the second embodiment of the present invention, the tolerance value storage 33d has been described as incorporated in the RAM 33, it may be stored in a program stored in the ROM 32. In addition, although the deviation has been described as obtained by subtracting the post-discharge measured value Ws from the combination calculated value Wc, various determinations may be carried out by calculating the proportion between the combination calculated value Wc and the post-discharge measured value Ws and then comparing such calculated proportion with a predetermined proportion. Accordingly, such changes and modifications are, unless they depart from the scope of the present invention as delivered from the claims annexed hereto, to be construed as included therein.

What is claimed is:

1. A combination weighting system for selecting a combination of some of weighing hoppers accommodating therein articles that have been supplied thereto, which combination results in a combination calculated value of measured weights of the articles contained in some of the weighing hoppers forming the combination, falling within a predetermined combination tolerance, and for subsequently discharging the articles in the selected weighing hoppers;

wherein determination is made to find if the combination calculated value of the respective measured weights of the containers contained in the selected weighing hoppers is displaced from a post-discharge measured value of the combined articles discharged from the selected weighing hoppers and merged together, which post-discharge measured value is measured after those articles have been discharged from the selected weighing hoppers, so that the hopper which is out of order can be identified based on a result of the determination, obtained from a number of cycles of weighing, and information on the identification numbers of the weighing hoppers that have been selected in the combination calculation.

2. The combination weighing system as claimed in claim 1, wherein the identification number of one or more hoppers identified is displayed by a display device.

3. A combination weighing system for selecting a combination of some of weighing hoppers accommodating therein articles that have been supplied thereto, which combination results in a combination calculated value of measured weights of the articles contained in some of the weighing hoppers forming the combination, falling within a predetermined combination tolerance, and for subsequently discharging the articles in the selected weighing hoppers;

wherein determination is made to find if the combination calculated value of the respective measured weights of the containers contained in the selected weighing hoppers is displaced from a post-discharge measured value of the combined articles discharged from the selected weighing hoppers and merged together, which post-discharge measured value is measured after those articles have been discharged from the selected weighing hoppers, so that information on identification numbers of the weighing hoppers utilized in the combination calculation can be outputted, and wherein a result of the determination, obtained from a number of cycles of weighing, and information on the identification numbers of the weighing hoppers that have been selected in the combination calculation are displayable.

4. The combination weighing system of claim 3, wherein the determination is made depending on whether or not a result of comparison between the combination calculated value and the post-discharge value is within a predetermined tolerance range, so that based on the result of the determination and information on the identification numbers of the weighting hoppers that have been selected in the combination calculation information on the identification number of one or more weighing hoppers which would have resulted in defective weighing can be outputted.

5. The combination weighing system as claimed in claim 4, further comprising an identification number storage for storing information on the identification numbers of the weighing hoppers that have been selected in the combination calculation, and a tolerance range storage for storing information on the predetermined tolerance range.

6. The combination weighing as claimed in claim 3, further comprising a number of weighing heads, each having a weighing hopper and a weighing device for measuring a weight of articles supplied to the weighing hopper.

7. A weight checking system for determining whether the product is acceptable or is to be rejected, by weighing the product while the latter is being transported by means of a conveyor, said weight checking system comprising:

a comparing means for comparing weight information on the measured weight of the product weighed by the weight checking system with weight information of the measured weight of the same product measured by a different weighing device; and a zero-point defect determining means for determining the possibility of occurrence of a zero-point defect in the weight checking system in the event that a result of comparison performed by the comparing means departs from a tolerances wherein the information on the measured weights are employed in the form of information on measured weights of a plurality of products.

8. The weight checking system as claimed in claim 7, further comprising:

a storage means for storing a plurality of information on measured values inputted from a different weighing device; and wherein when the measured values of the products are compared, a corresponding measured value is read from the storage means.

9. The weight checking system as claimed in claim 7, wherein as the information on the measured values, an average values obtained by averaging the measured values of a plurality of products is used.

10. The weight checking as claimed in claim 7, wherein in the event that it is determined that there is a possibility of occurrence of the zero-point defect, delivery of the products onto the weight checking system is delayed, so that the zero-point adjustment of the weight checking system can be carried out while the products are not delivered onto the weight checking system.

11. The weight checking system as claimed in claim 10, wherein an error before the zero-point adjustment and the difference in weight between the measured values after the zero-point adjustment are compared, and in the event that a result of the comparison is out of a range of predetermined values, a display appropriate to such situation is outputted.

12. A weighing system comprising:

an abnormal device determining means which reads a tendency of displacement between the combination calculated weight and the post-discharge measured value of the same contents measured after such contents have been bagged and which, based on the tendency of displacement so read, determines which one of the combination calculated value and the post-discharge value is abnormal; and a display device for displaying a result of the determination, wherein said determining means compares the combination calculated value of the same contents with the post-discharge measured value of the same contents, and wherein said determination is carried out depending on whether a displacement abnormality in which a result of the comparison deviates from a tolerance range continuously or discontinuously.

13. The weighing system as claimed in claim 12, wherein in the event that the displacement abnormality occurs continuously, it is determined that the weight checking system suffers from a zero-point abnormality, on the other hand, in the event that the displacement abnormality occurs discontinuously, it is determined that abnormality occurs in a particular head of the combination weighing system.

14. The weighing system as claimed in claim 10, wherein in the event that a deviation which has compared the combination calculated value and the post-discharge measured value of the same contents occurs continuously in a similar tendency, said abnormal device determining means determines that such displacement occurs as a result of a zero-point variation of the weight checking system.

15. A weighing system comprising:

a combination weighing system for outputting a combination calculated value of contents combined to have a weight equal to a predetermined value;

a weight checking system for outputting a post-discharge measured value which is measured after the contents have been bagged;

an abnormal device determining means which reads a tendency of displacement between the combination calculated weight and the post-discharge measured value of the same contents measured and which, based on the tendency of displacement so read, determines which one of the combination calculated value and the post-discharge measured value is abnormal;

a display device for displaying a result of the determination, wherein said determining means compares the combination calculated value of the same contents with the post-discharge measured value of the same contents, and wherein said determination is carried out depending on whether a displacement abnormality in which a result of the comparison deviates from a tolerance range occurs continuously or discontinuously.

16. The weighing system as claimed in claim 15, wherein in the event that the displacement abnormality occurs continuously, it is determined that the weight checking system suffers from a zero-point abnormality, on the other hand, in the event that the displacement abnormality occurs discontinuously, it is determined that abnormality occurs in a particular head of the combination weighing system.

17. A weighing system comprising:

a combination weighing system for outputting a combination calculated value of contents combined to have a weight equal to a predetermined value;

a weight checking system for outputting a post-discharge measured value which is measured after the contents have been bagged;

an abnormal device determining means which reads a tendency of displacement between the combination calculated weight and the post-discharge measured value of the same contents measured and which, based on the tendency of displacement so read, determines which one of the combination calculated value and the post-discharge measured value is abnormal;

a display device for displaying a result of the determination, wherein in the event that a deviation which has compared the combination calculated value and the post-discharge measured value of the same contents occurs continuously in a similar tendency, said abnormal device determining means determines that such displacement occurs as a result of a zero-point variation of the weight checking system.

18. A weighing, packaging and inspecting system comprising:

a weighing device for performing a weighing step of weighing contents to a predetermined value having a weighing system according to claim 2;

a packaging device for performing a packaging step of bagging the contends, discharged after having been weighed, into a bag an inspection system for performing an inspection step of inspecting a product bagged with the contents, said weighing device, said packaging device and said inspecting device being connected with each other through a communication network;

an abnormality diagnosing determining means for referring to information on a process at each step with respect to the same contents or the product to diagnose contents of an abnormality occurring at each of the steps; and a display device for displaying a result of the diagnosis performed by the abnormality determining means.

19. The weighing, packaging and inspecting system as claimed in claim 18, wherein said display device is provided in a remote controller separate from any one of the weighing device, the packaging device and the inspecting device.

20. The weighing, packaging and inspecting system as claimed in claim 19, wherein said remote controller transmits a halt command depending on a result of the diagnosis, said halt command being transmitted to a device, which is deemed abnormal, and a device upstream thereof.

21. The weighing, packaging and inspecting system as claimed in claim 20, wherein depending on the result of the diagnosis a restore command is transmitted to the device which is deemed abnormal, for restoring it to a normal state.

22. The weighing, packaging and inspecting system as claimed in claim 19, wherein said remote controller is provided with an input device for supplying data to each of the devices.

23. The weighing, packaging and inspecting system as claimed in claim 18, wherein said display device is to display a status of each of the devices.

24. The weighing, packaging and inspecting system as claimed in claim 18, wherein said inspecting device comprises:

a weight checking system for determining acceptability of the product by measuring a weight of the product and then determining whether or not the measured weight of the product is equal to a predetermined value; and a seal checker for inspecting a sealed condition of a bag of the product after packaging.

25. A weight checking system for determining whether the product is acceptable or is to be rejected, by weighing the product while the latter is being transported by means of a conveyor, said weight checking system comprising:

a combination weighing system as in claim 1;

a comparing means for comparing weight information on the measured weight of the product weighed by the weight checking system with weight information o the measured weight of the same product measured by a different weighing device; and a zero-point defect determining means for determining the possibility of occurrence of a zero-point defect in the weight checking system in the event that a result of comparison performed by the comparing means departs from a tolerance.

26. A weight checking system for determining whether the product is acceptable or is to be rejected, by weighing the product while the latter is being transported by means of a conveyor, said weight checking system comprising:

a combination weighing system as in claim 3, a comparing means for comparing weight information on the measured weight of the product weighed by the weight checking system with weight information o the measured weight of the same product measured by a different weighing device; and a zero-point defect determining means for determining the possibility of occurrence of a zero-point defect in the weight checking system in the event that a result of comparison performed by the comparing means departs from a tolerance.

27. A weighing, packaging and inspecting system comprising:

a weighing device for performing a weighing step of weighing contents to a predetermined value having a weighing system according to claim 3, a packaging device for performing a packaging step of bagging the contends, discharged after having been weighed, into a bag an inspection system for performing an inspection step of inspecting a product bagged with the contents, said weighing device, said packaging device and said inspecting device being connected with each other through a communication network;

an abnormality diagnosing determining means for referring to information on a process at each step with respect to the same contents or the product to diagnose contents of an abnormality occurring at each of the steps; and a display device for displaying a result of the diagnosis performed by the abnormality determining means.

28. The weighing, packaging an inspecting system as claimed in claim 27, wherein said display device is provided in a remote controller separate from any one of the weighing device, the packaging device an the inspecting device.

29. The weighing, packaging and inspecting system as claimed in claim 28, wherein said remote controller transmits a halt command depending on a result of the diagnosis, said halt command being transmitted to a device, which is deemed abnormal, and a device upstream thereof.

30. The weighing, packaging and inspecting system as claimed in claim 29, wherein depending on the result of the diagnosis a restore command is transmitted to the device which is deemed abnormal, for restoring it to a normal state.

31. The weighing, packaging and inspecting system as claimed in claim 28, wherein said remote controller is provided with an input device for supplying data to each of the devices.

32. The weighing, packaging and inspecting system as claimed in claim 27, wherein said display device is to display a status of each of the devices.

33. The weighing, packaging and inspecting system as claimed in claim 27, wherein said inspecting device comprises:

a weight checking system for determining acceptability of the product by measuring a weight of the product and then determining whether or not the measured weight of the product is equal to a predetermined value; and a seal checker for inspecting a sealed condition of a bag of the product after packaging.

34. A weighing, packaging and inspecting system comprising:

a weighing device for performing a weighing step of weighing contents to a predetermined value having a weighing system according to claim 19;

a packaging device for performing a packaging step of bagging the contends, discharged after having been weighed, into a bag an inspection system for performing an inspection step of inspecting a product bagged with the contents, said weighing device, said packaging device and said inspecting device being connected with each other through a communication network;

an abnormality diagnosing determining means for referring to information on a process at each step with respect to the same contents or the product to diagnose contents of an abnormality occurring at each of the steps; and a display device for displaying a result of the diagnosis performed by the abnormality determining means.

35. The weighing, packaging an inspecting system as claimed in claim 34, wherein said display device is provided in a remote controller separate from any one of the weighing device, the packaging device an the inspecting device.

36. The weighing, packaging and inspecting system as claimed in claim 35, wherein said remote controller transmits a halt command depending on a result of the diagnosis, said halt command being transmitted to a device, which is deemed abnormal, and a device upstream thereof.

37. The weighing, packaging and inspecting system as claimed in claim 36, wherein depending on the result of the diagnosis a restore command is transmitted to the device which is deemed abnormal, for restoring it to a normal state.

38. The weighing, packaging and inspecting system as claimed in claim 35, wherein said remote controller is provided with an input device for supplying data to each of the devices.

39. The weighing, packaging and inspecting system as claimed in claim 34, wherein said display device is to display a status of each of the devices.

40. The weighing, packaging and inspecting system as claimed in claim 34, wherein said inspecting device comprises:

a weight checking system for determining acceptability of the product by measuring a weight of the product and then determining whether or not the measured weight of the product is equal to a predetermined value; and a seal checker for inspecting a sealed condition of a bag of the product after packaging.

* * * * *